US009933629B2

(12) United States Patent
Minamisawa

(10) Patent No.: US 9,933,629 B2
(45) Date of Patent: Apr. 3, 2018

(54) OPTICAL UNIT WITH SHAKE CORRECTION FUNCTION

(71) Applicant: NIDEC SANKYO CORPORATION, Suwa-gun, Nagano (JP)

(72) Inventor: Shinji Minamisawa, Nagano (JP)

(73) Assignee: NIDEC SANKYO CORPORATION, Suwa-Gun, Nagano (JP)

(*) Notice: Subject to any disclaimer, the term of this patent is extended or adjusted under 35 U.S.C. 154(b) by 164 days.

(21) Appl. No.: 14/892,437

(22) PCT Filed: May 13, 2014

(86) PCT No.: PCT/JP2014/062730
§ 371 (c)(1),
(2) Date: Nov. 19, 2015

(87) PCT Pub. No.: WO2014/192539
PCT Pub. Date: Dec. 4, 2014

(65) Prior Publication Data
US 2016/0124242 A1 May 5, 2016

(30) Foreign Application Priority Data
May 30, 2013 (JP) .................................. 2013-114582

(51) Int. Cl.
G02B 27/64 (2006.01)
G03B 5/00 (2006.01)
(Continued)

(52) U.S. Cl.
CPC ............. G02B 27/646 (2013.01); G03B 5/00 (2013.01); H04N 5/2254 (2013.01);
(Continued)

(58) Field of Classification Search
CPC .................................................. G02B 27/646
(Continued)

(56) References Cited

U.S. PATENT DOCUMENTS

2014/0099089 A1* 4/2014 Katano ................. G02B 7/102
396/55

FOREIGN PATENT DOCUMENTS

JP 2007041455 A 2/2007
JP 2007093953 A 4/2007
(Continued)

OTHER PUBLICATIONS

International Search Report corresponding to Application No. PCT/JP2014/062730; dated Aug. 26, 2014, with English translation.

Primary Examiner — Bumsuk Won
Assistant Examiner — Tamara Y Washington
(74) Attorney, Agent, or Firm — Cantor Colburn LLP

(57) ABSTRACT

Provided is an optical unit with a shake correction function, said optical unit being capable of ensuring a space wherein a drive mechanism and the like are positioned between a side surface of an optical module and a side surface of a stationary body, even when the optical module is supported by a gimbal mechanism in such a manner as to be able to swing with respect to the stationary body. In the optical unit, a gimbal mechanism is disposed by utilizing corners of an optical module and corners of a square tube-shaped body section of a stationary body. In other words, the optical unit is configured in such a manner that: a rectangular movable frame is positioned between a rectangular second frame of the optical module and a rectangular frame secured to the square tube-shaped body section); and a first corner and a third corner of the movable frame are swingably supported by corners of the rectangular frame. The optical unit is further configured in such a manner that a second corner and a fourth corner of the moveable frame swingably support corners of the second frame.

25 Claims, 11 Drawing Sheets

(51) Int. Cl.
H04N 5/225 (2006.01)
H04N 5/232 (2006.01)

(52) U.S. Cl.
CPC ....... *H04N 5/2257* (2013.01); *H04N 5/23287* (2013.01); *G03B 2205/0007* (2013.01); *G03B 2205/0069* (2013.01)

(58) Field of Classification Search
USPC ...... 359/557, 554; 369/55, 144; 348/208.99, 348/208.11; 396/55, 144
See application file for complete search history.

(56) References Cited

FOREIGN PATENT DOCUMENTS

| | | | |
|---|---|---|---|
| JP | 2010078842 | A | 4/2010 |
| JP | 2012002973 | A | 1/2012 |
| WO | 2010044223 | A1 | 4/2010 |

\* cited by examiner

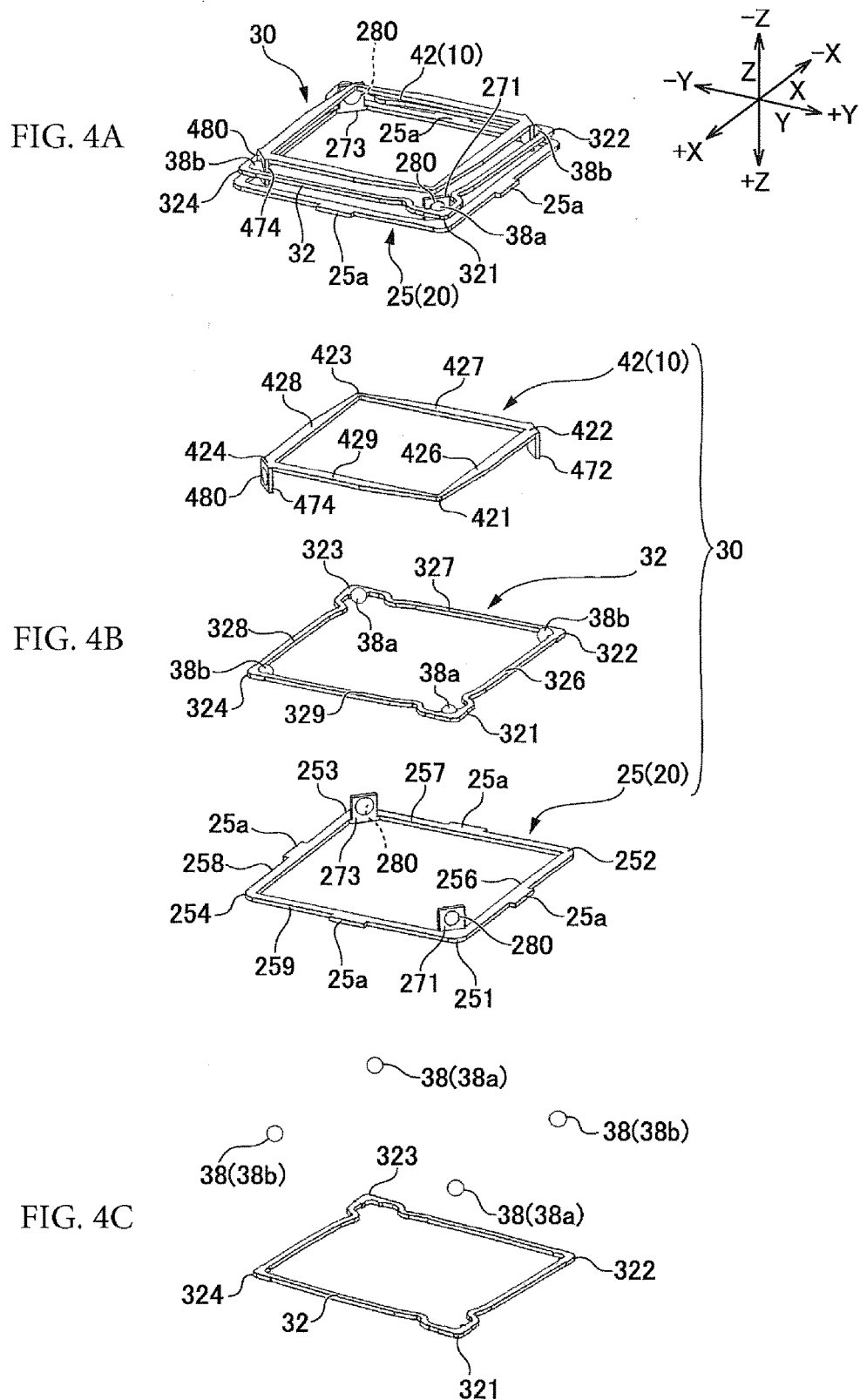

FIG. 9A
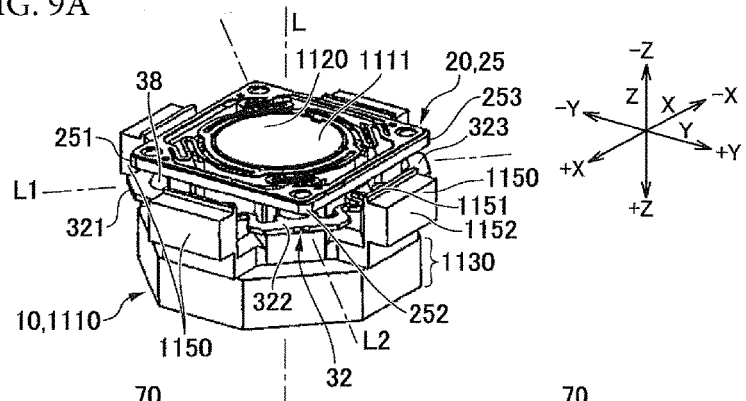
FIG. 9B
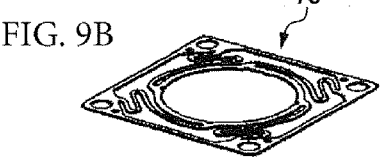
FIG. 9C
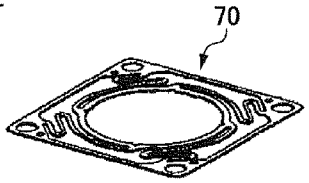
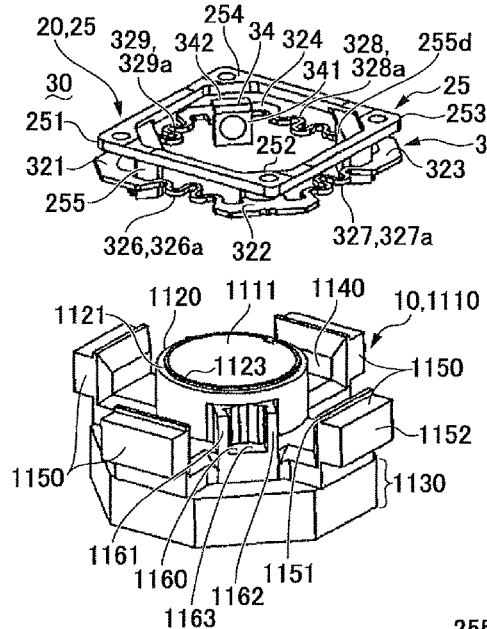
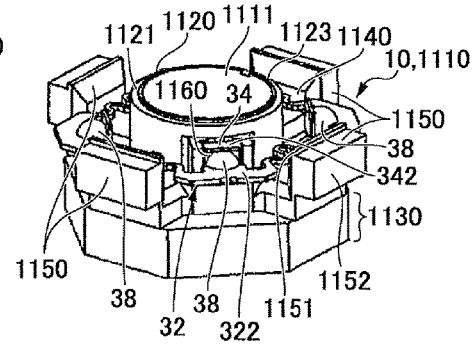
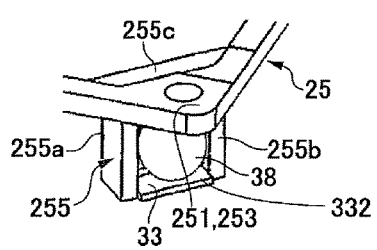
FIG. 9D

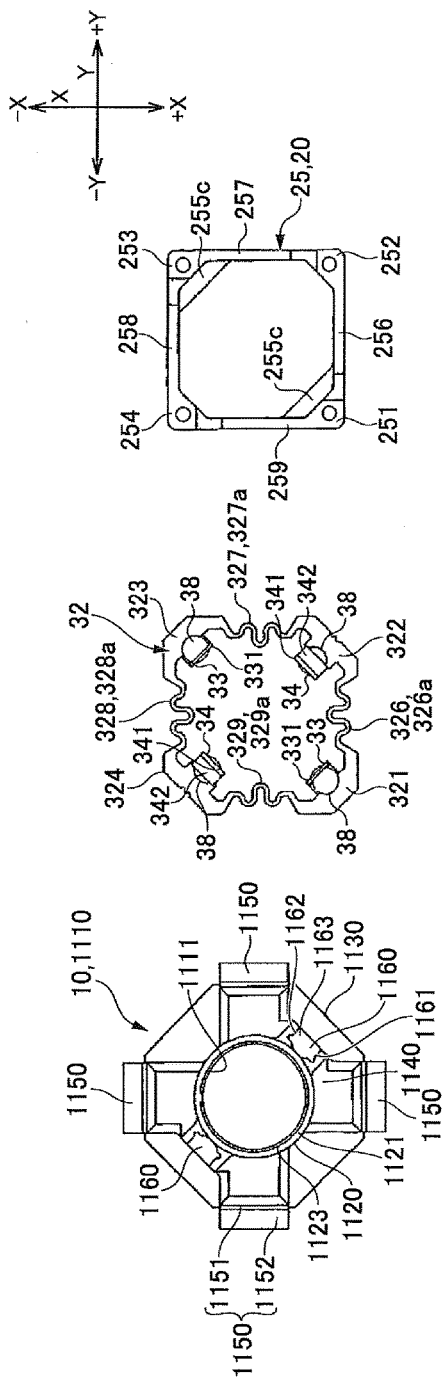
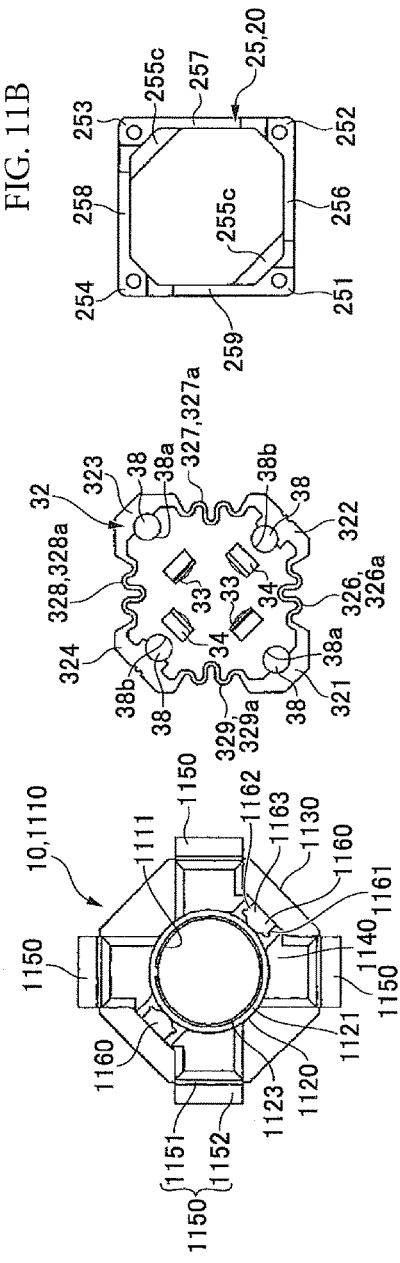
FIG. 11A
FIG. 11B

OPTICAL UNIT WITH SHAKE CORRECTION FUNCTION

CROSS REFERENCE TO RELATED APPLICATIONS

This is the U.S. national stage of application No. PCT/JP2014/062730, filed on May 13, 2014. Priority under 35 U.S.C. § 119(a) and 35 U.S.C. § 365(B) is claimed from Japanese Application No. 2013-114582, filed May 30, 2013; the disclosures of which are incorporated herein by reference.

FIELD OF THE INVENTION

At least an embodiment of the present invention relates to an optical unit with a shake correction function which is mounted on a cell phone with a camera or the like.

BACKGROUND

In recent years, a cell phone is structured as an optical device on which an optical unit for photographing is mounted. In the optical unit, for restraining disturbance of a photographed image due to a shake of a user's hand, a structure has been proposed in which an optical module is swung to correct the shake. In order to perform the shake correction, an optical module is required to be swingably supported by a fixed body and, in this case, when a plate-shaped spring is used, there may occur problems, for example, an impact resistance characteristic is low.

On the other hand, in an optical unit having a structure in which an optical module in a rectangular shape is surrounded by a rectangular tube-shaped body part of a fixed body, a structure has been proposed that a rectangular inside frame is provided between the optical module and the rectangular tube-shaped body part of the fixed body and a side part of a frame body is swung with respect to the fixed body through a shaft body on a side face of the fixed body and the optical module is swung with respect to the inside frame through a shaft body on the other side part of the inside frame (see Patent Literatures 1 and 2). According to this gimbal mechanism, even when a plate-shaped spring is not used, the optical module can be swingably supported by the fixed body.

PATENT LITERATURE

[PTL 1] Japanese Patent Laid-Open No. 2007-41455
[PTL 2] Japanese Patent Laid-Open No. 2007-93953

However, as the structures described in Patent Literatures 1 and 2, in a case that a gimbal mechanism is provided by utilizing a side face of the optical module, a side part of the inside frame and a side face of the fixed body, a free space is not provided between the side face of the optical module and the side face of the fixed body. Therefore, design is largely restricted such that a drive mechanism is required to provide on an outer side of the fixed body and a size of the optical module cannot be reduced.

SUMMARY

In view of the problem described above, at least an embodiment of the present invention provides an optical unit with a shake correction function which is capable of securing a space for disposing a drive mechanism between a side face of an optical module and a side face of a fixed body even when the optical module is swingably supported by the fixed body through a gimbal mechanism.

In order to attain the above, at least an embodiment of the present invention provides an optical unit with a shake correction function including an optical module, a fixed body having a body part which surrounds the optical module, a gimbal mechanism which swingably supports the optical module around a first axial line intersecting an optical axis direction and swingably supports the optical module around a second axial line intersecting the optical axis direction and the first axial line, and a shake correction drive mechanism structured to drive the optical module around the first axial line and the second axial line. The gimbal mechanism includes a rectangular movable frame having a first corner part, a second corner part adjacent to the first corner part, a third corner part separated in a direction of the first axial line from the first corner part, and a fourth corner part separated in a direction of the second axial line from the second corner part around an optical axis. The first corner part and the third corner part of the movable frame are swingably supported by the fixed body, and the second corner part and the fourth corner part of the movable frame swingably support the optical module.

In at least an embodiment of the present invention, a rectangular movable frame is disposed between the optical module and a body part of the fixed body, the first corner part and the third corner part of the movable frame are swingably supported by the fixed body, and the second corner part and the fourth corner part of the movable frame swingably support the optical module. Therefore, even when the optical module is swingably supported by the fixed body through the gimbal mechanism, a space for disposing the shake correction drive mechanism and the like can be secured between a side face of the optical module and a side face of the fixed body in the vicinity of a connecting part which connects one corner part with another corner part of the movable frame.

In at least an embodiment of the present invention, it is preferable that a coil and a magnet structuring the shake correction drive mechanism are disposed in a space between a side face of the optical module and a side face of the body part. According to this structure, since the shake correction drive mechanism is not required to be provided on an outer side of the fixed body, the size of the optical unit can be reduced.

In at least an embodiment of the present invention, it is preferable that, in the gimbal mechanism, a swing support part provided between the first corner part and the fixed body and a swing support part provided between the third corner part and the fixed body respectively include a protruded part provided in one of the movable frame and the fixed body and a receiving part in a concave shape provided in the other of the movable frame and the fixed body for receiving a tip end side of the protruded part, and a swing support part provided between the second corner part and the optical module and a swing support part provided between the fourth corner part and the optical module respectively include a protruded part provided in one of the movable frame and the optical module and a receiving part in a concave shape provided in the other of the movable frame and the optical module for receiving a tip end side of the protruded part. According to this structure, in comparison with a swingably supported structure through a shaft body, assembling process can be simplified.

In at least an embodiment of the present invention, it is preferable that a tip end face of the protruded part located on the receiving part side is formed in a hemispheric shape.

According to this structure, even when the movable frame and the optical module are swung in any posture, sliding of the protruded part on the receiving part is smooth.

In this case, the protruded part may be, for example, structured of a spherical body.

In at least an embodiment of the present invention, it is preferable that, in the movable frame, a first connecting part connecting the first corner part with the second corner part, a second connecting part connecting the second corner part with the third corner part, a third connecting part connecting the third corner part with the fourth corner part and a fourth connecting part connecting the fourth corner part with the first corner part are elastically deformable and, in all of the first corner part, the second corner part, the third corner part and the fourth corner part, the protruded parts and the receiving parts are elastically contacted with each other by respective elasticities of the first connecting part, the second connecting part, the third connecting part and the fourth connecting part. According to this structure, rattling is hard to be occurred between the protruded part and the receiving part.

In this case, it may be structured that each of the first connecting part, the second connecting part, the third connecting part and the fourth connecting part is provided with a meandering part which meanders in a direction intersecting the optical axis direction.

In at least an embodiment of the present invention, it is preferable that each of a plurality of the protruded parts is provided on the movable frame. According to this structure, a structure of the gimbal mechanism can be simplified.

In at least an embodiment of the present invention, it is preferable that all of the plurality of the protruded parts are located in the same plane intersecting the optical axis. According to this structure, a structure of the gimbal mechanism can be simplified.

In at least an embodiment of the present invention, it is preferable that all of the plurality of the protruded parts are provided on an inner side of the movable frame, two receiving parts provided in the first corner part and the third corner part are formed in portions which are protruded in the optical axis direction from a side of the fixed body so as to be located on an inner side of the movable frame, and two receiving parts provided in the second corner part and the fourth corner part are formed in portions which are protruded in the optical axis direction from a side of the optical module so as to be located on an inner side of the movable frame. According to this structure, even when a plurality of the protruded parts is located in the same plane intersecting the optical axis, the protruded parts and the receiving parts can be abutted with each other appropriately.

In at least an embodiment of the present invention, it may be structured that two receiving parts provided in the first corner part and the third corner part are formed in portions which are protruded from one side position in the optical axis direction relative to the movable frame to the other side in the optical axis direction so as to be located on the inner side of the movable frame, and two receiving parts provided in the second corner part and the fourth corner part are formed in portions which are protruded from the other side position in the optical axis direction relative to the movable frame to the one side in the optical axis direction so as to be located on the inner side of the movable frame.

In this case, it may be structured that two receiving parts provided in the first corner part and the third corner part are respectively formed in a plate-shaped member which is fixed to the fixed body, and two receiving parts provided in the second corner part and the fourth corner part are respectively formed in a plate-shaped member which is fixed to the optical module. According to this structure, regardless of a structure and material of the fixed body and the optical module, the receiving part can be structured superior in slidability and durability against the protruded part.

In at least an embodiment of the present invention, it is preferable that the fixed body includes two wall faces interposing each of the two protruded parts provided in the first corner part and the third corner part from both sides and two wall faces interposing each of the two protruded parts provided in the first corner part and the third corner part from both sides in the optical axis direction, and the optical module includes two wall faces interposing each of the two protruded parts provided in the second corner part and the fourth corner part from both sides and two wall faces interposing each of the two protruded parts provided in the second corner part and the fourth corner part from both sides in the optical axis direction. According to this structure, even when an impact is applied, the protruded part is hard to be disengaged from the receiving part.

In at least an embodiment of the present invention, it is preferable that, in the movable frame, the first corner part is protruded to an outer side relative to extended lines of the connecting parts which are adjacent to the first corner part on both sides, and the third corner part is protruded to an outer side relative to extended lines of the connecting parts which are adjacent to the third corner part on both sides. According to this structure, the receiving part provided in the body part is not required to protrude largely to an inner side.

In at least an embodiment of the present invention, it is preferable that the first corner part and the third corner part of the movable frame are supported by corner parts of a fixed body side rectangular frame which is fixed to an inner face of the body part, and the second corner part and the fourth corner part of the movable frame support corner parts of a module side rectangular frame which is fixed to an outer face of the optical module. According to this structure, the gimbal mechanism can be structured by using the fixed body side rectangular frame, the movable frame and the module side rectangular frame and thus assembling of the optical unit can be easily performed.

In at least an embodiment of the present invention, it is preferable that the fixed body side rectangular frame is provided with an engagement protruded part which is engaged with a cut-out part formed in the body part. According to this structure, the fixed body side rectangular frame can be firmly fixed to the rectangular tube-shaped body part.

In at least an embodiment of the present invention, it may be structured that the magnet is held by the optical module and the coil is held on an inner face of the body part. According to this structure, an electric current for shake correction is not required to supply to the optical module.

In at least an embodiment of the present invention, it may be structured that the coil is held by the optical module and the magnet is held on an inner face of the body part. According to this structure, a coil whose weight is lighter than a magnet is provided in the optical module and thus a drive current for shake correction can be reduced and responsibility of the shake correction can be improved.

In at least an embodiment of the present invention, it is preferable that the optical module includes an optical component and a holder which holds the optical component, and the holder includes an optical component holding part which holds the optical component, a movable frame arrangement space where the movable frame is disposed on an outer side in a radial direction of the optical component holding part, and a coil holding part which holds the coil on an outer side of the movable frame arrangement space. According to this structure, the gimbal mechanism can be provided in an inner side relative to an outward form of the holder when viewed in the optical axis direction.

In at least an embodiment of the present invention, it is preferable that the coil holding part is provided at each of positions on an outer side in the radial direction of a middle position between the first corner part and the second corner part, on an outer side in the radial direction of a middle position between the second corner part and the third corner part, on an outer side in the radial direction of a middle position between the third corner part and the fourth corner part, and on an outer side in the radial direction of a middle position between the fourth corner part and the first corner part. According to this structure, since the coil holding parts are provided at angular positions displaced from the corner parts of the movable frame, the outward form of the holder can be reduced when viewed in the optical axis direction.

In at least an embodiment of the present invention, a rectangular movable frame is disposed between the optical module and a body part of the fixed body, the first corner part and the third corner part of the movable frame are swingably supported by the fixed body, and the second corner part and the fourth corner part of the movable frame swingably support the optical module. Therefore, even when the optical module is swingably supported by the fixed body through the gimbal mechanism, a space for disposing the shake correction drive mechanism and the like can be secured between a side face of the optical module and a side face of the fixed body in the vicinity of a connecting part which connects one corner part with another corner part of the movable frame.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIGS. 4A, 4B and 4C are explanatory views showing structural members of a gimbal mechanism which is structured in an optical unit with a shake correction function in accordance with a first embodiment of the present invention.

FIGS. 9A, 9B, 9C and 9D are perspective views showing a gimbal mechanism and the like of an optical unit with a shake correction function in accordance with a second embodiment of the present invention.

FIGS. 11A and 11B are explanatory views showing plan structures of members used in a gimbal mechanism of an optical unit with a shake correction function in accordance with a second embodiment of the present invention.

DESCRIPTION OF EMBODIMENTS

An embodiment of the present invention will be described below with reference to the accompanying drawings. In the following description, a structure for preventing a hand shake in a photographing unit will be described as an example. Further, in the following description, three directions perpendicular to each other are set to be an "X"-axis, a "Y"-axis and a "Z"-axis and a direction along an optical axis "L" (lens optical axis/optical axis of an optical element) is set to be the "Z"-axis. Further, in the following description, regarding swings of the respective directions, turning around the "X"-axis corresponds to a so-called pitching (vertical swing), turning around the "Y"-axis corresponds to a so-called yawing (lateral swing), and turning around the "Z"-axis corresponds to a so-called rolling. Further, "+X" indicates one side of the "X"-axis, "−X" indicates the other side, "+Y" indicates one side of the "Y"-axis, "−Y" indicates the other side, "+Z" indicates one side (opposite side to an object side/rear side in an optical axis direction) of the "Z"-axis, and "−Z" indicates the other side (object side/front side in the optical axis direction).

[First Embodiment]
(Entire Structure of Optical Unit for Photographing)

Figure 1:
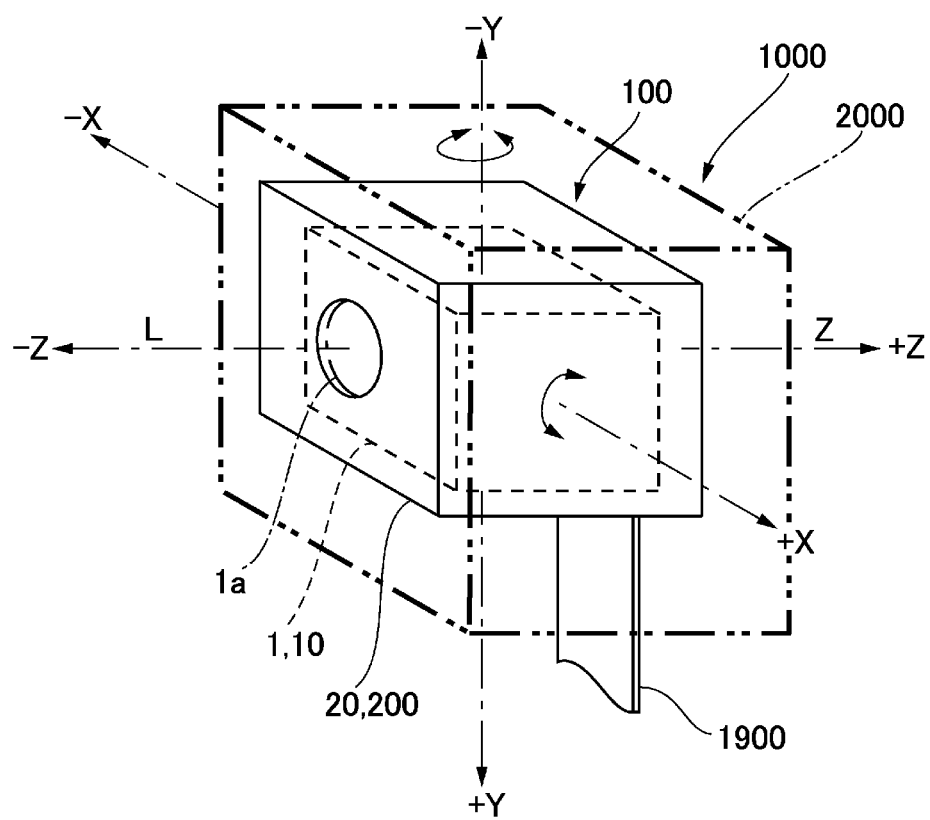
FIG. 1 is an explanatory view schematically showing a state in which an optical unit with a shake correction function in accordance with a first embodiment of the present invention is mounted on an optical device such as a cell phone.

FIG. 1 is an explanatory view schematically showing a state in which an optical unit with a shake correction function in accordance with a first embodiment of the present invention is mounted on an optical device such as a cell phone.

An optical unit 100 (optical unit with a shake correction function) shown in FIG. 1 is a thin camera used in an optical device 1000 such as a cell phone with a camera and is mounted in a supported state by a chassis 2000 (device main body) of the optical device 1000. In the optical unit 100, when a shake such as a hand shake is occurred in the optical device 1000 at the time of photographing, disturbance occurs in a photographed image. Therefore, the optical unit 100 in this embodiment includes, as described below, a shake correction drive mechanism (not shown in FIG. 1) which swingably supports an optical module 10 having a photographing unit 1 in an inside of a fixed body 20 and is structured to swing the photographing unit 1 on the basis of a detection result for a hand shake by a shake detection sensor such as a gyroscope mounted on the optical unit 100 or a gyroscope mounted on a main body side of the optical device 1000. Further, a flexible circuit board 1900 is led out from the optical unit 100 for supplying power to the photographing unit 1 and the shake correction drive mechanism and the flexible circuit board 1900 is electrically connected with a host control section or the like which is provided on a main body side of the optical device 1000. Further, the flexible circuit board 1900 is also provided with a function for outputting a signal from the photographing unit 1. In this embodiment, when viewed in a direction of an optical axis "L", a lens 1a is circular but the optical module 10 is formed in a rectangular shape.

(Schematic Structure of Optical Unit 100)

Figure 2A:
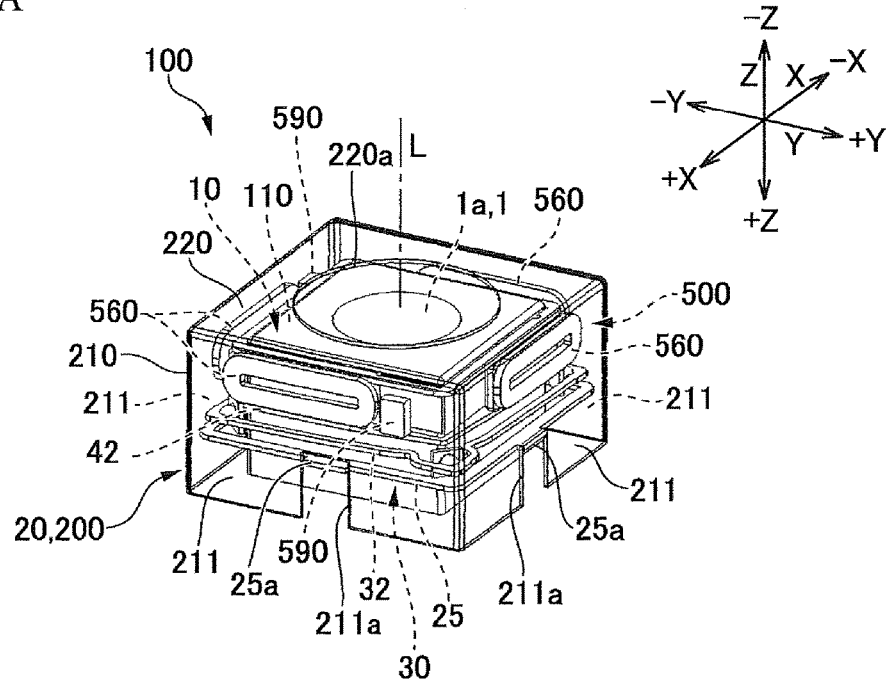
FIGS. 2A and 2B are views showing an outward appearance of an optical unit with a shake correction function and the like in accordance with a first embodiment of the present invention.
Figure 2B:
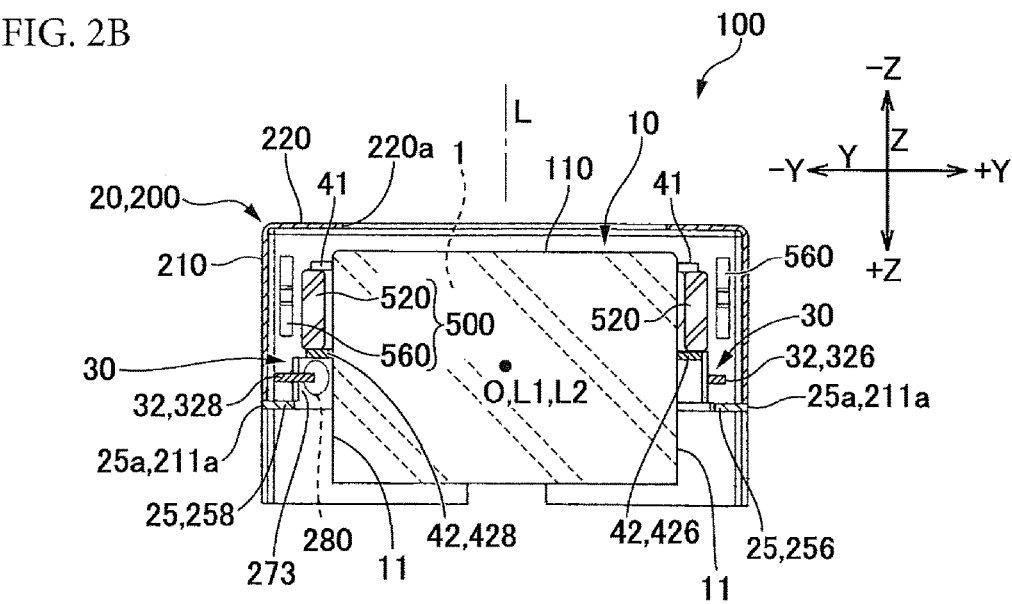
Figure 3A:
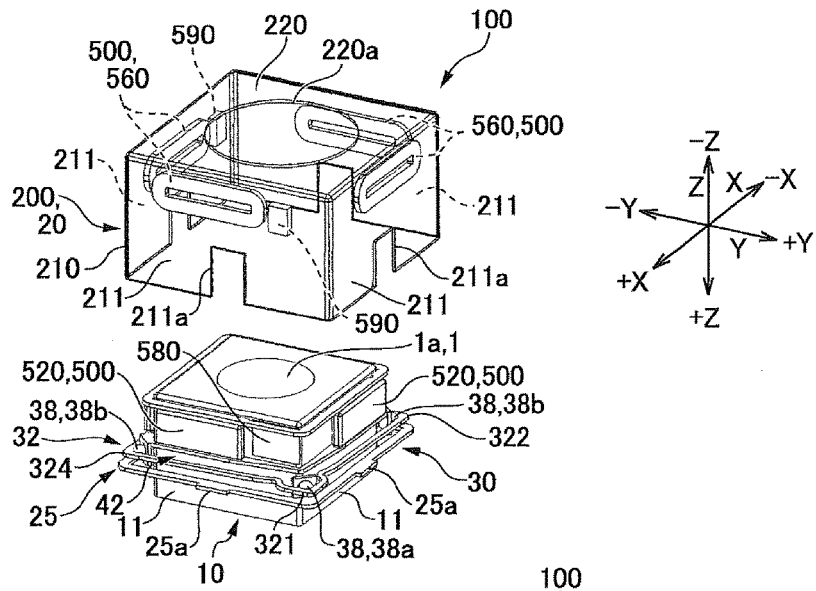
FIGS. 3A, 3B and 3C are exploded perspective views showing an optical unit with a shake correction function in accordance with a first embodiment of the present invention.
Figure 3B:
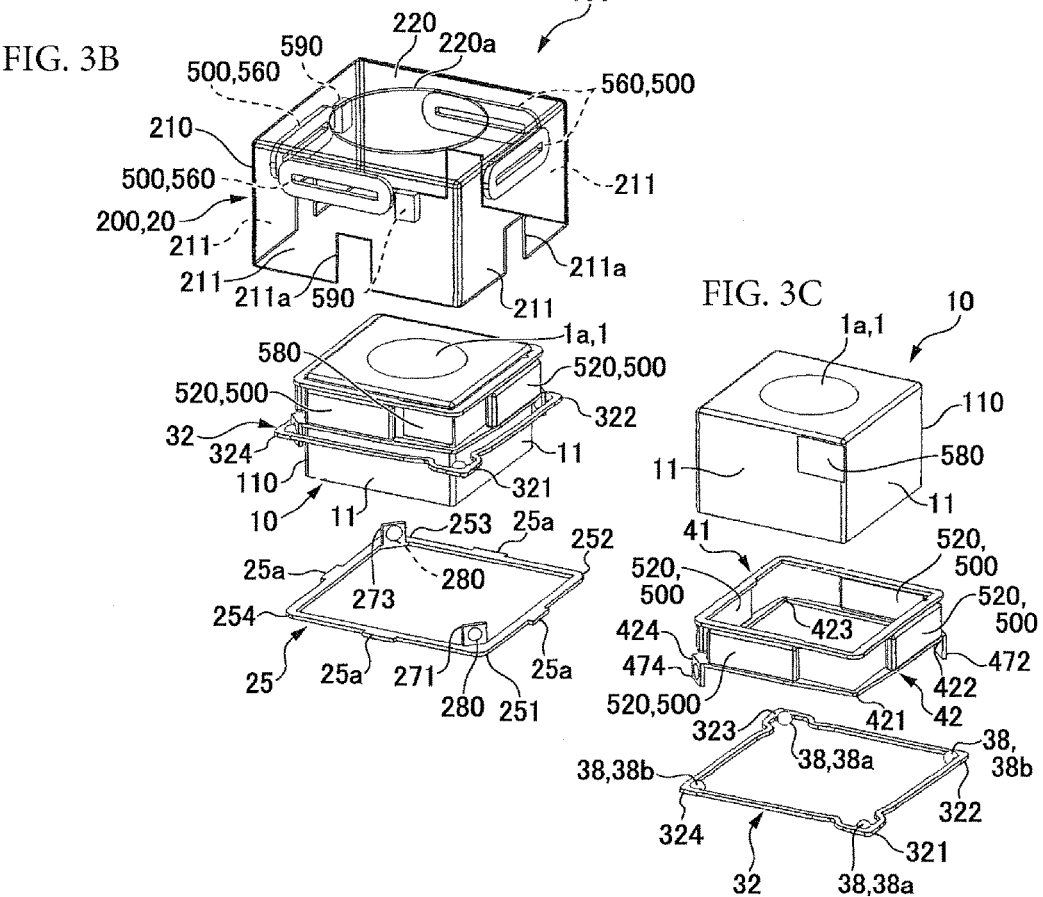
Figure 3C:
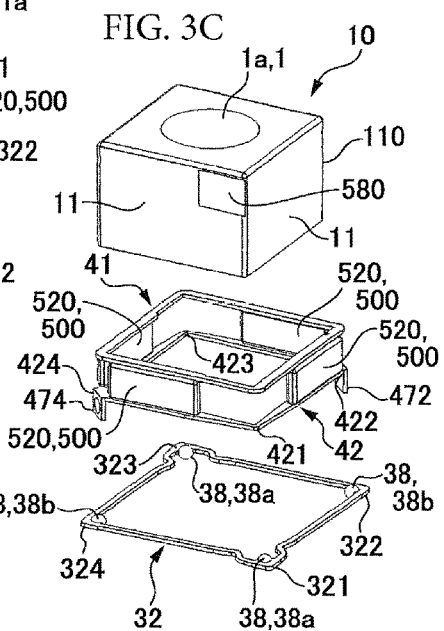

FIGS. 2A and 2B are views showing an outward appearance of an optical unit with a shake correction function and the like in accordance with a first embodiment of the present invention. FIG. 2A is a perspective view showing the optical unit when viewed from an object side and FIG. 2B is a cross-sectional view showing the optical unit. FIGS. 3A, 3B and 3C are exploded perspective views showing an optical unit 100 with a shake correction function in accordance with a first embodiment of the present invention. FIG. 3A is an exploded perspective view showing the optical unit 100, FIG. 3B is its exploded perspective view further disassembled, and FIG. 3C is an exploded perspective view showing a state that magnets are detached from the optical module 10. In FIGS. 2A and 2B and FIGS. 3A, 3B and 3C, a case 200 is not translucent but the case 200 is expressed in a see-through state.

In FIGS. 2A and 2B and FIGS. 3A, 3B and 3C, the optical unit 100 includes a fixed body 20, an optical module 10 having a cover 110 within which a photographing unit 1 is accommodated, a gimbal mechanism 30 which supports the optical module 10 so as to be capable of displacing with respect to the fixed body 20, and a shake correction drive mechanism 500 structured to generate a magnetic drive force for relatively displacing the optical module 10 with respect to the fixed body 20 between the optical module 10 and the fixed body 20.

As shown in FIGS. 3A, 3B and 3C, the fixed body 20 includes a case 200. The case 200 is provided with a rectangular tube-shaped body part 210 surrounding the optical module 10 and a rectangular end plate part 220 which closes an opening part on an object side of the rectangular tube-shaped body part 210. The end plate part 220 is formed with a window 220a through which a light from an object to be photographed is incident. The rectangular tube-shaped body part 210 of the case 200 is formed with an open end at an end part on an opposite side ("+Z" side) to an object side (side where the optical axis "L" is extended). Each of four side plate parts 211 of the rectangular tube-shaped body part 210 of the case 200 is formed on one side "+Z" in the "Z"-axis direction with a cut-out part 211a which is extended from one side "+Z" toward the other side "−Z" in the "Z"-axis direction. In this embodiment, each inner face of four side plate parts 211 is fixed with a drive coil structured of an air-core coil 560. Further, a photo reflector 590 is fixed to inner faces of the side face parts 211 located on one side "+X" in the "X"-axis direction and the other side "−Y" in the "Y"-axis direction. In this embodiment, the air-core coil 560 is disposed at a position displaced to one side from a center position of the side plate part 211 and the photo reflector 590 is fixed on a side of the air-core coil 560.

(Structure of Optical Module 10)

The optical module 10 includes the photographing unit 1 and the cover 110 formed in a rectangular box shape which accommodates the photographing unit 1 in its inside. The cover 110 structures an outer peripheral portion of the optical module 10 and four side face parts 11 of the optical module 10 are structured of four side faces of the cover 110. A plate-shaped magnet 520 is disposed on each of outer faces of four side face parts 11 at a position facing an air-core coil 560. The magnets 520 structure a shake correction drive mechanism 500 together with the air-core coils 560. The magnet 520 is magnetized so that a magnetic pole of its outer face side and a magnetic pole of its inner face side are different from each other. The magnet 520 is divided in two pieces in an optical axis direction and is magnetized so that magnetic poles located on the air-core coil 560 side are different from each other. Further, long side portions of the air-core coil 560 on the upper and lower sides are utilized as an effective side.

As shown in FIG. 2B, the magnet 520 and the air-core coil 560 are disposed at positions displaced from each other in the "Z"-axis direction and the center in the "Z"-axis direction of the magnet 520 is located on one side "+Z" in the "Z"-axis direction with respect to the center in the "Z"-axis direction of the air-core coil 560. Therefore, when an electric current is supplied to the air-core coil 560, a large moment can be acted on the optical module 10 around a swing center "O" of the optical module 10 (around first axial line "L1" and second axial line "L2" described below). In other words, a direction of an electro-magnetic force generated in the long side portion by supplying an electric current to the air-core coil 560 is substantially coincided with a tangential direction of a circle passing the long side portion with the swing center "O" as a center. Therefore, a magnetic flux generated from the magnet 520 can be utilized effectively and thus a drive force of the shake correction drive mechanism 500 can be increased.

In FIGS. 3A, 3B and 3C, in four side face parts 11 of the optical module 10, a reflection layer 580 is adhesively fixed to inner faces of the side face parts 11 located on one side "+X" in the "X"-axis direction and the other side "−Y" in the "Y"-axis direction at positions facing the photo reflector 590. In this embodiment, the magnet 520 is disposed at a position displaced to one side from the center position of the side face part 11 and the reflection layer 580 is adhesively fixed on a side of the magnet 520.

In order to dispose the magnets 520 in the optical module 10, four magnets 520 are adhesively fixed or joined by soldering between a rectangular first frame 41 and a rectangular second frame 42 and then inner faces of the magnets 520, an inner face of the first frame 41 and an inner face of the second frame 42 are adhesively fixed to the side face part 11 of the optical module 10. Further, in this embodiment, in the first frame 41 and the second frame 42, the second frame 42 located on one side "+Z" in the "Z"-axis direction is utilized as a rectangular part of the optical module 10 when viewed in the optical axis "L" direction to structure a gimbal mechanism 30 which swingably supports the optical module 10 with respect to the fixed body 20.

(Structure of Gimbal Mechanism 30)

Figure 5A:
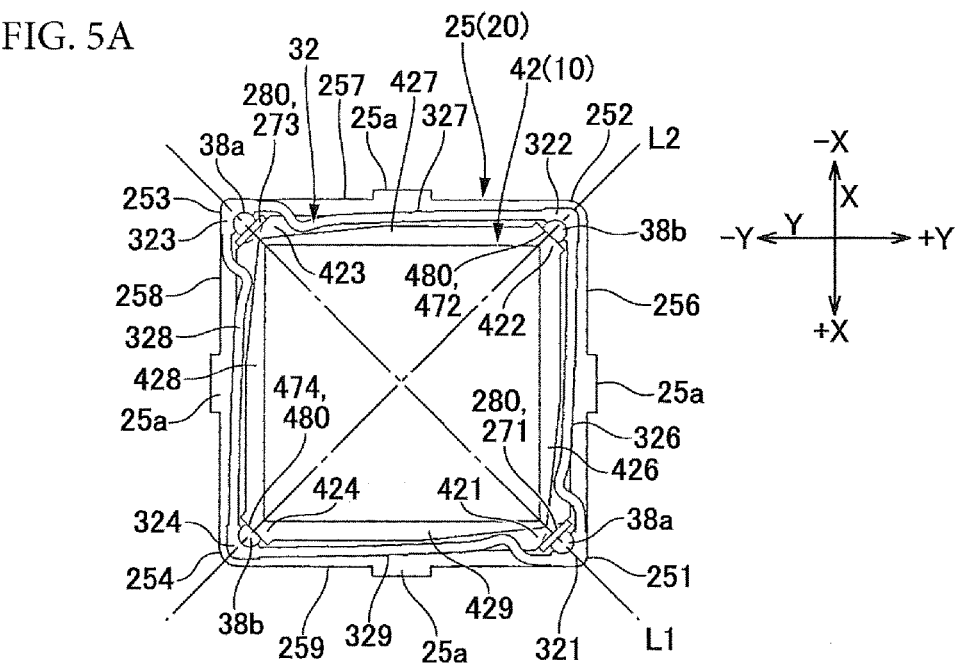
FIGS. 5A and 5B are explanatory views showing a gimbal mechanism which is structured in an optical unit with a shake correction function in accordance with a first embodiment of the present invention.
Figure 5B:
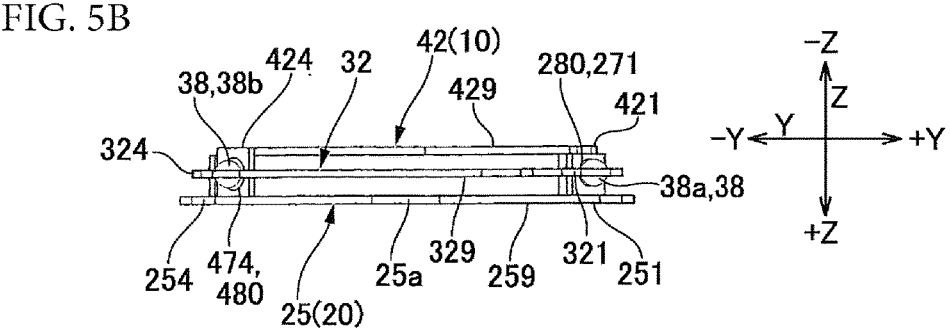

FIGS. 4A, 4B and 4C are explanatory views showing structural members of the gimbal mechanism 30 which is structured in the optical unit 100 with a shake correction function in accordance with the first embodiment of the present invention. FIG. 4A is a perspective view showing the gimbal mechanism 30, FIG. 4B is an exploded perspective view showing the gimbal mechanism 30, and FIG. 4C is an explanatory view showing a movable frame used in the gimbal mechanism 30. FIGS. 5A and 5B are explanatory views showing the gimbal mechanism 30 which is structured in the optical unit 100 with a shake correction function in accordance with the first embodiment of the present invention. FIG. 5A is a plan view showing the gimbal mechanism 30 and FIG. 5B is its side view.

In the optical unit 100 in this embodiment, in order to correct a shake of a hand, the optical module 10 is required to be swingably supported around a first axial line "L1" (see FIG. 5A) intersecting the optical axis "L" direction and the optical module 10 is required to be swingably supported around a second axial line "L2" (see FIG. 5A) intersecting the optical axis "L" direction and the first axial line "L1". Therefore, the gimbal mechanism 30 is structured between the optical module 10 and the fixed body 20 at a substantially center position in the optical axis "L" direction of the optical unit 100 as described below with reference to FIGS. 4A, 4B and 4C and FIGS. 5A and 5B.

In this embodiment, the gimbal mechanism 30 is structured by using the second frame 42 (rectangular part/module side rectangular frame) of the optical module 10, a rectangular movable frame 32, and a rectangular frame 25 (fixed body side rectangular frame) which is fixed to the rectangular tube-shaped body part 210 of the case 200 (fixed body 20) by welding, adhesion or the like. Therefore, the gimbal mechanism 30 swingably supports the optical module 10 on one side "+Z" in the "Z"-axis direction with respect to the magnets 520. In this embodiment, the second frame 42, the movable frame 32 and the rectangular frame 25 are formed in a square shape when viewed in the optical axis "L" direction and thus the optical axis "L", the first axial line "L1" and the second axial line "L2" are perpendicular to each other.

In this embodiment, the second frame 42 is provided with a first corner part 421, a second corner part 422, a third corner part 423 and a fourth corner part 424 around the optical axis "L" and is provided with a first side part 426, a second side part 427, a third side part 428 and a fourth side part 429 between the first corner part 421 and the second corner part 422, between the second corner part 422 and the third corner part 423, between the third corner part 423 and the fourth corner part 424, and between the fourth corner part 424 and the first corner part 421.

The movable frame 32 is provided with a first corner part 321, a second corner part 322, a third corner part 323 and a fourth corner part 324 around the optical axis "L" and is provided with a first connecting part 326 (first side part), a second connecting part 327 (second side part), a third connecting part 328 (third side part) and a fourth connecting part 329 (fourth side part) between the first corner part 321 and the second corner part 322, between the second corner part 322 and the third corner part 323, between the third corner part 323 and the fourth corner part 324, and between the fourth corner part 324 and the first corner part 321.

The rectangular frame 25 is provided with a first corner part 251, a second corner part 252, a third corner part 253 and a fourth corner part 254 around the optical axis "L" and is provided with a first side part 256, a second side part 257, a third side part 258 and a fourth side part 259 between the first corner part 251 and the second corner part 252, between the second corner part 252 and the third corner part 253, between the third corner part 253 and the fourth corner part 254, and between the fourth corner part 254 and the first corner part 251. The rectangular frame 25 is formed with engagement protruded parts 25a protruding toward outer sides at centers in length directions of the first side part 256, the second side part 257, the third side part 258 and the fourth side part 259. The engagement protruded parts 25a are fitted into cut-out parts 211a formed in the rectangular tube-shaped body part 210. Therefore, the rectangular frame 25 is firmly fixed to the rectangular tube-shaped body part 210.

The first side parts 256, 326 and 426 are extended in the "X"-axis direction on one side "+Y" in the "Y"-axis direction and the third side parts 258, 328 and 428 are extended in the "X"-axis direction in parallel to the first side parts 256, 326 and 426 on the other side "−Y" in the "Y"-axis direction. The second side parts 257, 327 and 427 are extended in the "Y"-axis direction on the other side "−X" in the "X"-axis direction and the fourth side parts 259, 329 and 429 are extended in the "Y"-axis direction in parallel to the second side parts 257, 327 and 427 on one side "+X" in the "X"-axis direction. Therefore, the first corner parts 251, 321 and 421 are located on one side "+X" in the "X"-axis direction and one side "+Y" in the "Y"-axis direction, the second corner parts 252, 322 and 422 are located on the other side "−X" in the "X"-axis direction and one side "+Y" in the "Y"-axis direction, the third corner parts 253, 323 and 423 are located on the other side "−X" in the "X"-axis direction and the other side "−Y" in the "Y"-axis direction, and the fourth corner parts 254, 324 and 424 are located on one side "+X" in the "X"-axis direction and the other side "−Y" in the "Y"-axis direction.

As shown in FIGS. 5A and 5B, in this embodiment, the optical module 10 is swingably supported around the first axial line "L1" intersecting the optical axis "L" direction and the optical module 10 is swingably supported around the second axial line "L2"intersecting the optical axis "L" direction and the first axial line "L1" by using the rectangular frame 25, the movable frame 32 and the second frame 42. In other words, the first corner part 321 and the third corner part 323 of the movable frame 32 located on the first axial line "L1" are swingably supported by the first corner part 251 and the third corner part 253 of the rectangular frame 25 (fixed body 20), and the second corner part 322 and the fourth corner part 324 of the movable frame 32 located on the second axial line "L2" swingably support the second corner part 422 and the fourth corner part 424 of the second frame 42 (optical module 10).

More specifically, swing support parts structured between the first corner part 321 and the third corner part 323 of the movable frame 32 and the first corner part 251 and the third corner part 253 of the rectangular frame 25 respectively include a protruded part 38a provided in one of the movable frame 32 and the rectangular frame 25 and a receiving part in a concave shape which receives a tip end side of the protruded part 38a provided in the other of the movable frame 32 and the rectangular frame 25. In this embodiment, a protruded part 38a is provided in the first corner part 321 and the third corner part 323 of the movable frame 32 and a receiving part 280 in a concave shape is provided in the first corner part 251 and the third corner part 253 of the rectangular frame 25. The protruded part 38a is a metal spherical body 38 which is welded in the first corner part 321 and the third corner part 323 of the movable frame 32 and a tip end side of the protruded part 38a is formed in a hemispheric shape. On the other hand, the receiving part 280 is a bottomed hemispheric recessed part formed on an outer face side of each of plate parts 271 and 273 which are protruded to the other side "−Z" in the "Z"-axis direction from an inner edge of the first corner part 251 and an inner edge of the third corner part 253 of the rectangular frame 25. Inner face sides of the plate parts 271 and 273 are protruded in a hemispheric shape when the receiving part 280 is formed. The rectangular frame 25 is located to one side "+Z" in the "Z"-axis direction of the movable frame 32 and the size of the rectangular frame 25 is larger than the movable frame 32. Therefore, tip end sides of the protruded parts 38*a* of the movable frame 32 are fitted to the receiving parts 280 of the rectangular frame 25 from outer sides and, as a result, the movable frame 32 is swingably supported around the first axial line "L1" by the rectangular frame 25 (fixed body 20 side).

Further, in this embodiment, swing support parts structured between the second corner part 322 and the fourth corner part 324 of the movable frame 32 and the second corner part 422 and the fourth corner part 424 of the second frame 42 respectively include a protruded part 38*b* provided in one of the movable frame 32 and the second frame 42 (optical module 10 side) and a receiving part in a concave shape which receives a tip end side of the protruded part 38*b* provided in the other of the movable frame 32 and the second frame 42. In this embodiment, the protruded part 38*b* is provided in the second corner part 322 and the fourth corner part 324 of the movable frame 32, and the receiving part 480 in a concave shape is provided in the second corner part 422 and the fourth corner part 424 of the second frame 42. As described above, in this embodiment, two protruded parts 38*a* and two protruded parts 38*b* are formed in the movable frame 32 and are located on the same plane ("XY" plane) intersecting the optical axis "L". The protruded part 38*b* is a metal spherical body 38 which is welded to the second corner part 322 and the fourth corner part 324 of the movable frame 32 and a tip end side of the protruded part 38*b* is formed in a hemispheric shape. On the other hand, the receiving part 480 is a bottomed hemispheric recessed part formed on an outer face side of each of plate parts 472 and 474 which are protruded to one side "+Z" in the "Z"-axis direction from an outer edge of the second corner part 422 and an outer edge of the fourth corner part 424 of the second frame 42. The second frame 42 is located to the other side "−Z" in the "Z"-axis direction of the movable frame 32 and the size of the second frame 42 is smaller than the movable frame 32. Therefore, the protruded parts 38*b* of the movable frame 32 are fitted to the receiving parts 480 of the second frame 42 from outer sides and, as a result, the movable frame 32 swingably supports the second frame 42 (optical module 10 side) around the second axial line "L2". In this embodiment, the first side part 426, the second side part 427, the third side part 428 and the fourth side part 429 of the second frame 42 are formed so that width dimensions on the sides where the plate parts 472 and 474 are formed are set larger than those of the other sides.

In this manner, the optical module 10 is swingably supported by the fixed body 20 around the first axial line "L1" and around the second axial line "L2" through the movable frame 32 used in the gimbal mechanism 30.

The movable frame 32 is structured of metal material or the like having elasticity and is provided with elasticity so that the movable frame 32 is not resiliently bent to a lower side by the own weight of the optical module 10 but, when an impact is applied from the outside, the impact can be absorbed. Further, the first connecting part 326, the second connecting part 327, the third connecting part 328 and the fourth connecting part 329 of the movable frame 32 are respectively capable of being elastically deformed to an inner side and an outer side. Therefore, in all of the first corner part 321, the second corner part 322, the third corner part 323 and the fourth corner part 324, the protruded parts 38*a* and 38*b* and the receiving parts 280 and 480 are elastically contacted with each other by elasticities of the first connecting part 326, the second connecting part 327, the third connecting part 328 and the fourth connecting part 329.

Accordingly, rattling is not occurred between the protruded parts 38*a* and 38*b* and the receiving parts 280 and 480.

Especially, in this embodiment, in the second corner part 322 and the fourth corner part 324, the protruded parts 38*b* (spherical body 38) are disposed on inner sides on respective extended lines of the first connecting part 326, the second connecting part 327, the third connecting part 328 and the fourth connecting part 329. On the other hand, in the first corner part 321 and the third corner part 323, the protruded parts 38*a* (spherical body 38) are disposed on outer sides on the respective extended lines of the first connecting part 326, the second connecting part 327, the third connecting part 328 and the fourth connecting part 329. Therefore, when the protruded part 38*b* of the movable frame 32 is pressed to an outer side by the receiving part 480 of the second frame 42, the first connecting part 326, the second connecting part 327, the third connecting part 328 and the fourth connecting part 329 are resiliently bent and, as a result, the protruded parts 38*a* of the movable frame 32 are displaced to inner sides. Accordingly, in all of the first corner part 321, the second corner part 322, the third corner part 323 and the fourth corner part 324, the protruded parts 38*a* and 38*b* and receiving parts 280 and 480 are elastically contacted with each other by elasticities of the first connecting part 326, the second connecting part 327, the third connecting part 328 and the fourth connecting part 329.

Further, in the first corner part 321 and the third corner part 323, the movable frame 32 is curved to inner sides from both sides and then curved toward outer sides and the protruded parts 38*a* (spherical body 38) are located on outer sides relative to the respective extended lines of the first connecting part 326, the second connecting part 327, the third connecting part 328 and the fourth connecting part 329. Therefore, even when the movable frame 32 is deformed so that the protruded parts 38*a* of the movable frame 32 are displaced to inner sides, sufficient gap spaces are secured between the movable frame 32 and the plate parts 271 and 273 of the rectangular frame 25 and thus, even when the movable frame 32 is swung, the movable frame 32 and the rectangular frame 25 are not interfered with each other. Further, in the first corner part 321 and the third corner part 323, the protruded parts 38*a* (spherical body 38) are located on outer sides relative to the respective extended lines of the first connecting part 326, the second connecting part 327, the third connecting part 328 and the fourth connecting part 329. Therefore, the receiving parts 280 are not required to be protruded largely to inner sides in the rectangular frame 25. (Structure and Basic Operation of Shake Correction Drive Mechanism 500 and the Like)

In the optical unit 100 in this embodiment, when the optical device 1000 shown in FIG. 1 is shaken, the shake is detected by a gyroscope or the like and a control IC (not shown) controls the shake correction drive mechanism 500. In other words, a drive current for canceling the shake detected by the gyroscope is supplied to the air-core coil 560. In this case, the electric current is supplied to a part of four air-core coils 560 and the electric current is not supplied to other air-core coils 560. Alternatively, the electric current is supplied to all of four air-core coils 560 but balance of the electric current supplied to the four air-core coils 560 is controlled. As a result, the optical module 10 is swung around the first axial line "L1" or around the second axial line "L2" to correct the shake of a hand. Alternatively, the optical module 10 is swung around the first axial line "L1" and is swung around the second axial line "L2" to correct the shake of a hand. In this case, the second photo reflector 590 detects a distance (displacement) to the optical module 10 and the shake correction drive mechanism 500 is controlled based on a detected result by the photo reflector 590.

(Principal Effects in this Embodiment)

As described above, in the optical unit 100 in this embodiment, the optical module 10 includes the second frame 42 (rectangular part), the fixed body 20 includes the rectangular tube-shaped body part 210 surrounding the rectangular part of the optical module 10, and the gimbal mechanism 30 is provided by utilizing free spaces formed at corners between the optical module 10 and the rectangular tube-shaped body part 210. In other words, in this embodiment, the rectangular movable frame 32 is disposed between the second frame 42 of the optical module 10 and the rectangular frame 25 fixed to the rectangular tube-shaped body part 210. Further, the first corner part 321 and the third corner part 323 of the movable frame 32 are swingably supported by the corner parts of the fixed body 20 (first corner part 251 and third corner part 253 of the rectangular frame 25), and the second corner part 322 and the fourth corner part 324 of the movable frame 32 swingably support the corner parts of the second frame 42 (second corner part 422 and fourth corner part 424). Therefore, even when the optical module 10 is swingably supported by the gimbal mechanism 30 with respect to the fixed body 20, a space for disposing the air-core coils 560 and the magnets 520 of the shake correction drive mechanism 500 and the like can be secured between the side face of the optical module 10 and the side face of the fixed body 20. Accordingly, the shake correction drive mechanism 500 is not required to be provided on an outer side of the fixed body 20 and thus the size of the optical unit 100 can be reduced.

Further, in all the swing support parts of the gimbal mechanism 30 in this embodiment, the tip end sides of the protruded parts 38a and 38b are supported by the concave-shaped receiving parts 280 and 480. Therefore, in comparison with a structure that a shaft body is penetrated through a shaft hole so as to be swingably supported, the assembling process can be simplified. Further, the tip end faces of the protruded parts 38a and 38b located on the sides of the receiving parts 280 and 480 are formed in a hemispheric shape and thus, even when the movable frame 32 and the optical module 10 is swung to be any posture, sliding of the protruded parts 38a and 38b with the receiving parts 280 and 480 is smooth. Further, the gimbal mechanism 30 is disposed at a substantially center position in the optical axis "L" direction of the optical unit 100 and thus the gimbal mechanism 30 supports the optical module 10 at a gravity center position in the optical axis "L" direction of the optical module 10. Therefore, unnecessary inclination is hard to be occurred in the optical module 10.

In addition, in all the swing support parts of the gimbal mechanism 30 in this embodiment, the tip end sides of the protruded parts 38a and 38b and the receiving parts 280 and 480 are elastically abutted with each other. Therefore, rattling is hard to be occurred between the tip end sides of the protruded parts 38a and 38b and the receiving parts 280 and 480.

Further, a plurality of the protruded parts 38a and 38b is provided on the movable frame 32 and a plurality of the protruded parts 38a and 38b is located in the same plane intersecting the optical axis. Therefore, in comparison with a structure that the protruded parts 38a and 38b are disposed at different positions in the optical axis direction, the structure of the gimbal mechanism 30 can be simplified.

Further, two receiving parts 280 provided in the first corner part 321 and the third corner part 323 of the movable frame 32 are protruded from the fixed body 20 side in the "Z"-axis direction and are located on an inner side of the movable frame 32. Further, two receiving parts 480 provided in the second corner part 322 and the fourth corner part 324 are protruded from the second frame 42 side of the optical module 10 in the "Z"-axis direction and are located on an inner side of the movable frame 32. Therefore, even when all of a plurality of the protruded parts 38a and 38b are located in the same plane intersecting the optical axis, the protruded parts 38a and 38b and the receiving parts 280 and 480 are abutted with each other appropriately. In addition, two receiving parts 280 are protruded toward the other side "−Z" in the "Z"-axis direction from the fixed body 20 side and two receiving parts 480 are protruded toward one side "+Z" in the "Z"-axis direction from the second frame 42 of the optical module 10. Therefore, the second frame 42 and the rectangular frame 25 can be disposed on opposite sides to each other with respect to the movable frame 32 and thus interference of the plate parts 472 and 474 of the second frame 42 with the rectangular frame 25 and interference of the plate parts 271 and 273 of the rectangular frame 25 with the second frame 42 are not occurred.

Further, in this embodiment, the second frame 42 (module side rectangular frame) fixed to an outer face of the optical module 10 is utilized as a rectangular part of the optical module 10, and the gimbal mechanism 30 is structured by utilizing the second frame 42, the movable frame 32 and the rectangular frame 25 (fixed body side rectangular frame) fixed to an inner face of the rectangular tube-shaped body part 210. Therefore, in comparison with a structure that an outer face of optical module 10 and an inner face of rectangular tube-shaped body part 210 are directly utilized, assembling of the gimbal mechanism 30 and the like are easily performed.

(Modified Example of First Embodiment)

In the first embodiment, the optical module 10 is formed in a rectangular shape. However, in a case that a rectangular part is formed in a part of a circular optical module 10 when viewed in the optical axis direction, the gimbal mechanism 30 may be structured by utilizing the rectangular part.

In the first embodiment, two receiving parts 280 are formed in portions protruded toward the other side "−Z" in the "Z"-axis direction from the fixed body 20 side and two receiving parts 480 are formed in portions protruded toward one side "+Z" in the "Z"-axis direction from the second frame 42 of the optical module 10. However, the receiving part 280 and the receiving part 480 may be formed in portions protruding in the same direction of the "Z"-axis direction. In other words, a structure may be adopted in which the second frame 42 and the rectangular frame 25 are disposed on the same side with respect to the movable frame 32.

(Second Embodiment)

(Schematic Structure of Optical Unit 100)

Figure 6A:
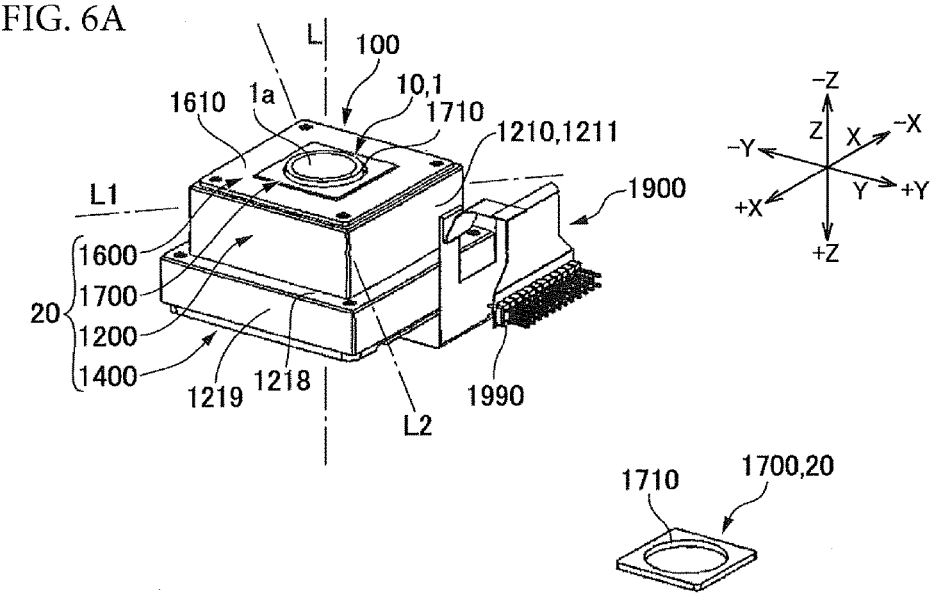
FIGS. 6A and 6B are perspective views showing an outward appearance of an optical unit with a shake correction function and the like in accordance with a second embodiment of the present invention.
Figure 6B:
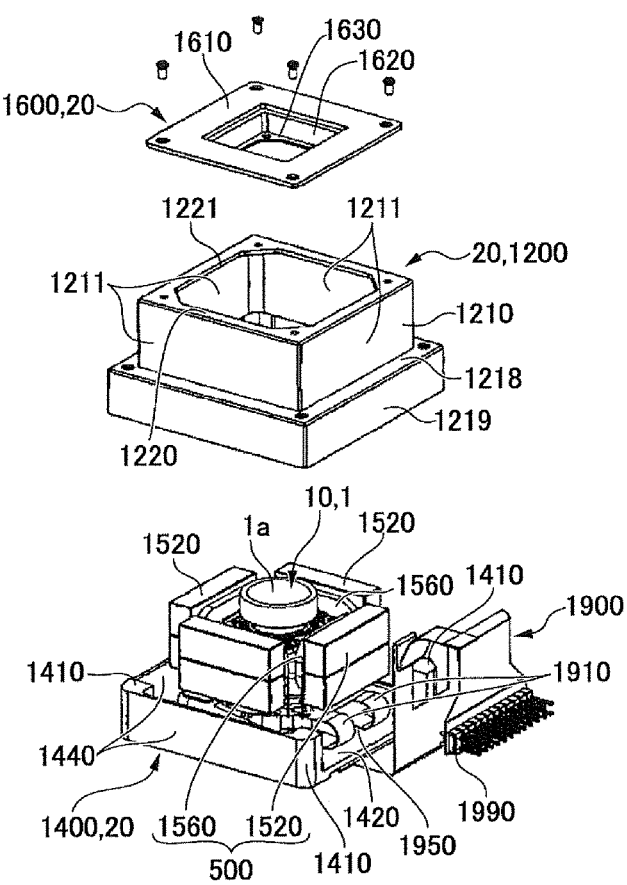
Figure 7A:
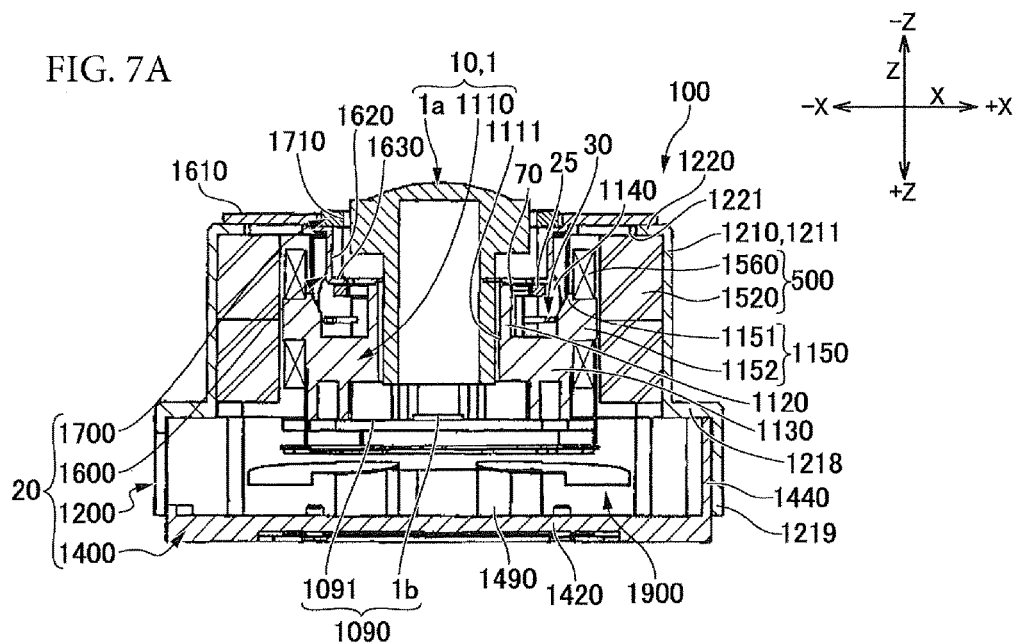
FIGS. 7A and 7B are explanatory views showing a cross sectional structure of an optical unit with a shake correction function in accordance with a second embodiment of the present invention.
Figure 7B:
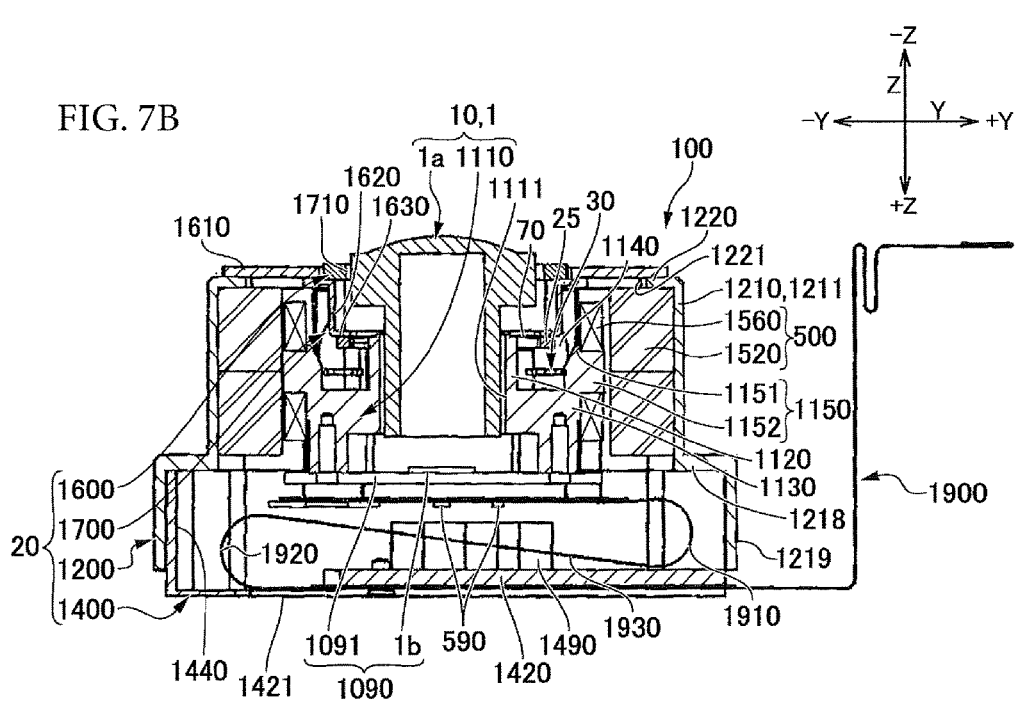
Figure 8:
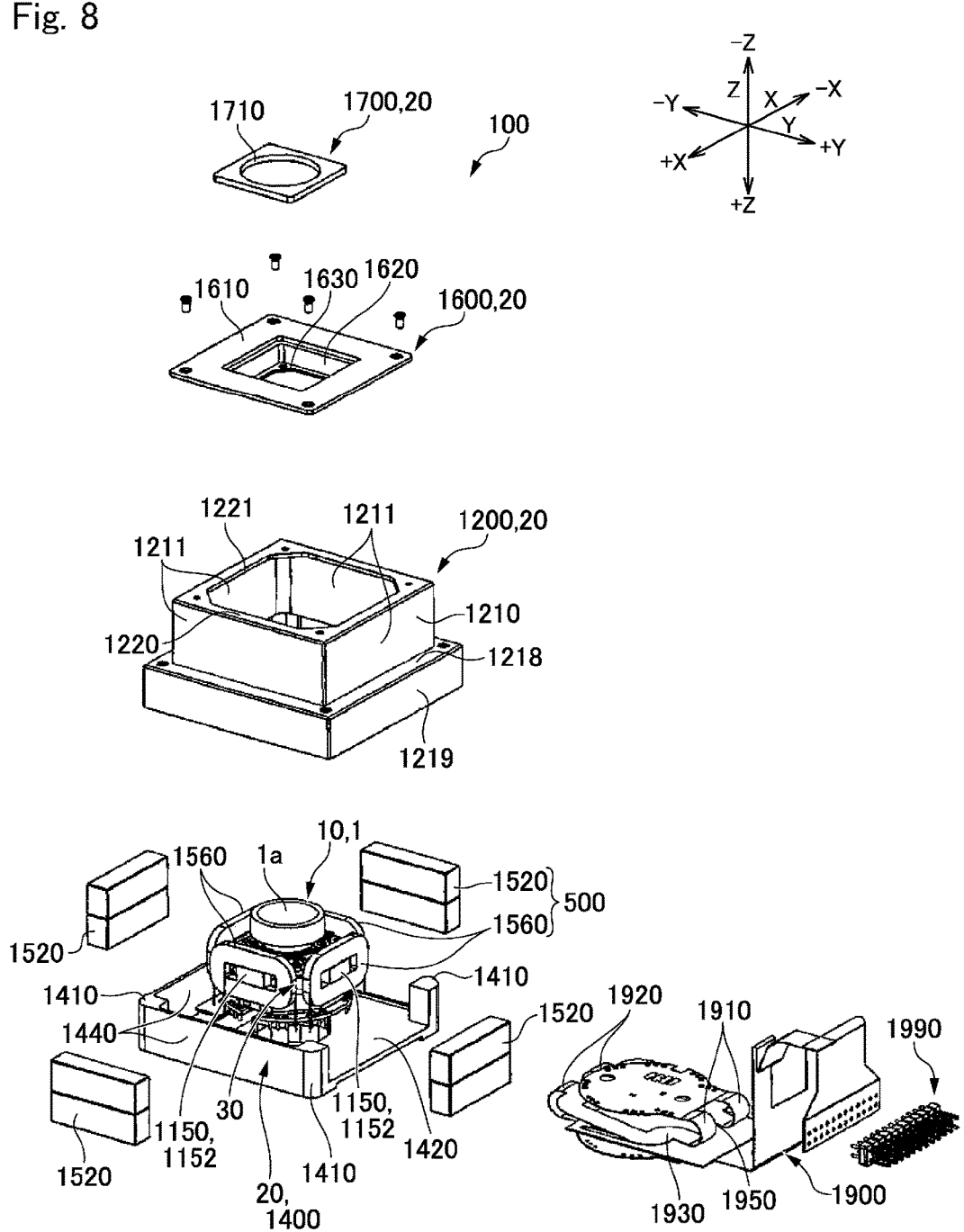
FIG. 8 is an exploded perspective view showing an optical unit with a shake correction function in accordance with a second embodiment of the present invention which is further disassembled.

FIGS. 6A and 6B are perspective views showing an outward appearance of an optical unit 100 with a shake correction function and the like in accordance with a second embodiment of the present invention. FIG. 6A is a perspective view showing the optical unit which is viewed from an object side and FIG. 6B is an exploded perspective view of the optical unit. FIGS. 7A and 7B are explanatory views showing a cross sectional structure of the optical unit 100 with a shake correction function in accordance with the second embodiment of the present invention. FIG. 7A is an "XZ" cross-sectional view showing the optical unit and FIG. 7B is a "YZ" cross-sectional view showing the optical unit. FIG. 8 is an exploded perspective view showing the optical unit 100 with a shake correction function in accordance with the second embodiment of the present invention which is further disassembled. Basic structures of the optical unit in this embodiment are similar to the first embodiment and thus the same reference signs are used in corresponding portions for explanation.

In FIGS. 6A and 6B, FIGS. 7A and 7B and FIG. 8, an optical unit 100 in this embodiment, similarly to the first embodiment, also includes a fixed body 20, an optical module 10, a gimbal mechanism 30 which supports the optical module 10 so as to be capable of displacing with respect to the fixed body 20, and a shake correction drive mechanism 500 structured to generate a magnetic drive force for relatively displacing the optical module 10 with respect to the fixed body 20 between the optical module 10 and the fixed body 20.

The fixed body 20 includes an upper case 1200. The upper case 1200 is provided with a rectangular tube-shaped body part 1210 (body part) surrounding the optical module 10 and an end plate part 1220 in a rectangular frame shape which is protruded to an inner side in a radial direction from an end part on the other side "−Z" in the "Z"-axis direction of the rectangular tube-shaped body part 1210. The end plate part 1220 is formed with a window 1221. The rectangular tube-shaped body part 1210 of the upper case 1200 is provided with a rectangular frame-shaped flange part 1218, which is extended to an outer side in the radial direction on an opposite side ("+Z" side) to an object side (side where the optical axis "L" is extended), and a rectangular tube part 1219 extended to one side "+Z" in the "Z"-axis direction from an outer side edge of the rectangular frame-shaped flange part 1218.

(Structure of Shake Correction Drive Mechanism 500)

Also in this embodiment, similarly to the first embodiment, the shake correction drive mechanism 500 is a magnetic drive mechanism utilizing plate-shaped magnets 1520 and coils 1560. The coils 1560 are held by the optical module 10 and the magnets 1520 are held by inner faces of four side plate parts 1211 of the rectangular tube-shaped body part 1210 of the upper case 1200. In this embodiment, the magnet 1520 is magnetized so that its outer face side and its inner face side have different poles. Further, the magnet 1520 is divided in two pieces in an optical axis direction and is magnetized so that magnetic poles located on the coil 1560 side are different from each other. Therefore, long side portions of the coil 1560 on the upper and lower sides are utilized as an effective side. In this embodiment, magnetized patterns of four magnets 1520 are the same as each other on their outer face sides and inner face sides. Therefore, the magnets 1520 adjacent in a circumferential direction do not attract to each other and thus assembling and the like are easily performed.

The upper case 1200 is structured of magnetic material and functions as a yoke for the magnets 1520. The end plate part 1220 of the upper case 1200 is formed with the opening part 1221 whose opening edge is located on an outer side in a radial direction relative to faces of the magnets 1520 facing the coils 1560 when viewed in the optical axis "L" direction. Therefore, magnetic lines of force of the magnet 1520 are restrained to direct toward the end plate part 1220 of the upper case 1200 (yoke) on a front side in the optical axis "L" direction.

(Structure of Optical Module 10)

The optical module 10 includes a photographing unit 1, a holder 1110 which holds a lens 1a (optical component) of the photographing unit 1, and a circuit module 1090 fixed to an end part on one side "+Z" in the "Z"-axis direction of the holder 1110.

The holder 1110 structures an outer peripheral portion of the optical module 10 and is generally provided with an optical component holding part 1120, which is formed in a tube shape and holds the lens 1a, and a thick flange part 1130 which is enlarged from an end part on one side "+Z" in the "Z"-axis direction of the optical component holding part 1120. The holder 1110 is formed with a through hole 1111 penetrating through the optical component holding part 1120 and the flange part 1130. The through hole 1111 is formed so that a portion located on an inner side of the flange part 1130 has a larger diameter than a portion located on an inner side of the optical component holding part 1120.

On an outer side in a radial direction of the optical element holding part 1120, the holder 1110 is provided with a movable frame arrangement space 1140 where a movable frame 32 of the gimbal mechanism 30 is disposed and coil holding parts 1150 which hold the coils 1560 on an outer side of the movable frame arrangement space 1140. The coil holding part 1150 is a portion which is stood up from an outer side edge of the flange part 1130 toward the other side "−Z" in the "Z"-axis direction on an outer side in the radial direction of the movable frame arrangement space 1140 and is formed at four positions in the circumferential direction. The coil holding part 1150 is comprised of a plate-shaped part 1151 which is stood up from the outer side edge of the flange part 1130 toward the other side "−Z" in the "Z"-axis direction and a protruded part 1152 which is protruded from the plate-shaped part 1151 to an outer side in the radial direction. The coil 1560 is an air-core coil and is adhesively bonded to the coil holding part 1150 in a state that the protruded part 1152 is fitted to an opening part of the air-core coil. In this state, a part of the protruded part 1152 is protruded from an outer face of the coil 1560 (face which faces the magnet 1520).

In the optical module 10 structured as described above, a flexible circuit board 1900 is connected with an end part of the optical module 10 on one side "+Z" in the "Z"-axis direction (end part on one side "+Z" in the "Z"-axis direction of a circuit module 1090). The flexible circuit board 1900 is extended along the "Y"-axis direction and led out to the outside of the optical unit 100. A connector 1990 is connected with an end part of the flexible circuit board 1900 outside the optical unit 100 and power is supplied to the coils 1560 through the connector 1990 and the flexible circuit board 1900. Further, a photographed result of an imaging element 1b is outputted through the flexible circuit board 1900 and the connector 1990.

(Detailed Structure of Fixed Body 20)

The fixed body 20 includes a rectangular lower case 1400 which covers one side "+Z" in the "Z"-axis direction of the upper case 1200. The lower case 1400 is provided with a rectangular bottom plate part 1420 and pillar shaped parts 1410 which are protruded from four corners of the bottom plate part 1420 toward the other side "−Z" in the "Z"-axis direction. When the upper case 1200 is fitted so as to cover the lower case 1400, the flange part 1218 of the upper case 1200 is abutted with the pillar shaped parts 1410. Therefore, the upper case 1200 and the lower case 1400 are fixed to each other by fastening the flange part 1218 to the pillar shaped parts 1410 by using screws. In this embodiment, the lower case 1400 is provided with side plate parts 1440 on one side "+X" in the "X"-axis direction and on the other side "−Y" in the "Y"-axis direction.

The fixed body 20 includes a cover 1600 and a plate-shaped stopper 1700 on the other side "−Z" in the "Z"-axis direction. The cover 1600 is a nonmagnetic metal plate and is provided with a front plate part 1610 in a rectangular frame shape which is overlapped with a face of the end plate part 1220 of the upper case 1200 on the other side "−Z" in the "Z"-axis direction, a tube part 1620 in a rectangular tube shape which is protruded from an inner circumferential edge of the front plate part 1610 toward one side "+Z" in the "Z"-axis direction (rear side in the optical axis direction) through the opening part 1221 of the upper case 1200 so as to surround an end part on one side "+Z" in the "Z"-axis direction of the optical module 10, and a rear plate part 1630 in a rectangular frame shape which is protruded from an end part on one side "+Z" in the "Z"-axis direction of the tube part 1620 to an inner side in the radial direction.

The fixed body 20 includes a plate-shaped stopper 1700 which is fixed to the front plate part 1610 of the cover 1600. The plate-shaped stopper 1700 surrounds an end part on the other side "−Z" in the "Z"-axis direction of the optical module 10. More specifically, a center of the plate-shaped stopper 1700 is formed with a window 1710 through which an end part on the other side "−Z" in the "Z"-axis direction of the optical module 10 is penetrated. A dimension of an inner diameter of the window 1710 is larger than a dimension of an outer diameter of the end part on the other side "−Z" in the "Z"-axis direction of the optical module 10. Therefore, a movable range in the "X"-axis direction and a movable range in the "Y"-axis direction of the optical module 10 are restricted by the plate-shaped stopper 1700.

(Structure of Flexible Circuit Board 1900)

In the optical unit 100 in this embodiment, the bottom plate part 1420 of the lower case 1400 is formed with an opening part 1421 and the flexible circuit board 1900 which is connected with the end part on one side "+Z" in the "Z"-axis direction of the optical module 10 is extended outside the optical unit 100 through the opening part 1421.

The flexible circuit board 1900 is connected with the end part on one side "+Z" in the "Z"-axis direction of the optical module 10 and then, first, is extended to one side "+Y" in the "Y"-axis direction (first direction) and, after that, is extended outside through the opening part 1421 of the bottom plate part 1420 of the lower case 1400 and then, is further extended to one side "+Y" in the "Y"-axis direction. In this case, the flexible circuit board 1900 is provided with a first curved part 1910 which is bent in a circular arc shape at a position on one side "+Y" in the "Y"-axis direction relative to a portion superposed on the optical module 10 on one side "+Z" in the "Z"-axis direction toward the other side "−Y" in the "Y"-axis direction, a strip-shaped part 1930 which is extended from the first curved part 1910 to the other side "−Y" in the "Y"-axis direction, and a second curved part 1920 which is bent in a circular arc shape at an end part of the strip-shaped part 1930 located on the other side "−Y" in the "Y"-axis direction relative to the portion superposed on the optical module 10 on one side "+Z" in the "Z"-axis direction toward one side "+Y" in the "Y"-axis direction. In this embodiment, the first curved part 1910 and the second curved part 1920 are curved with the same radius of curvature as each other.

The first curved part 1910, the strip-shaped part 1930 and the second curved part 1920 of the flexible circuit board 1900 are divided into two portions in the "X"-axis direction (second direction) through a slit 1950 extended along the "Y"-axis direction.

(Structure of Gimbal Mechanism 30)

Figure 10:
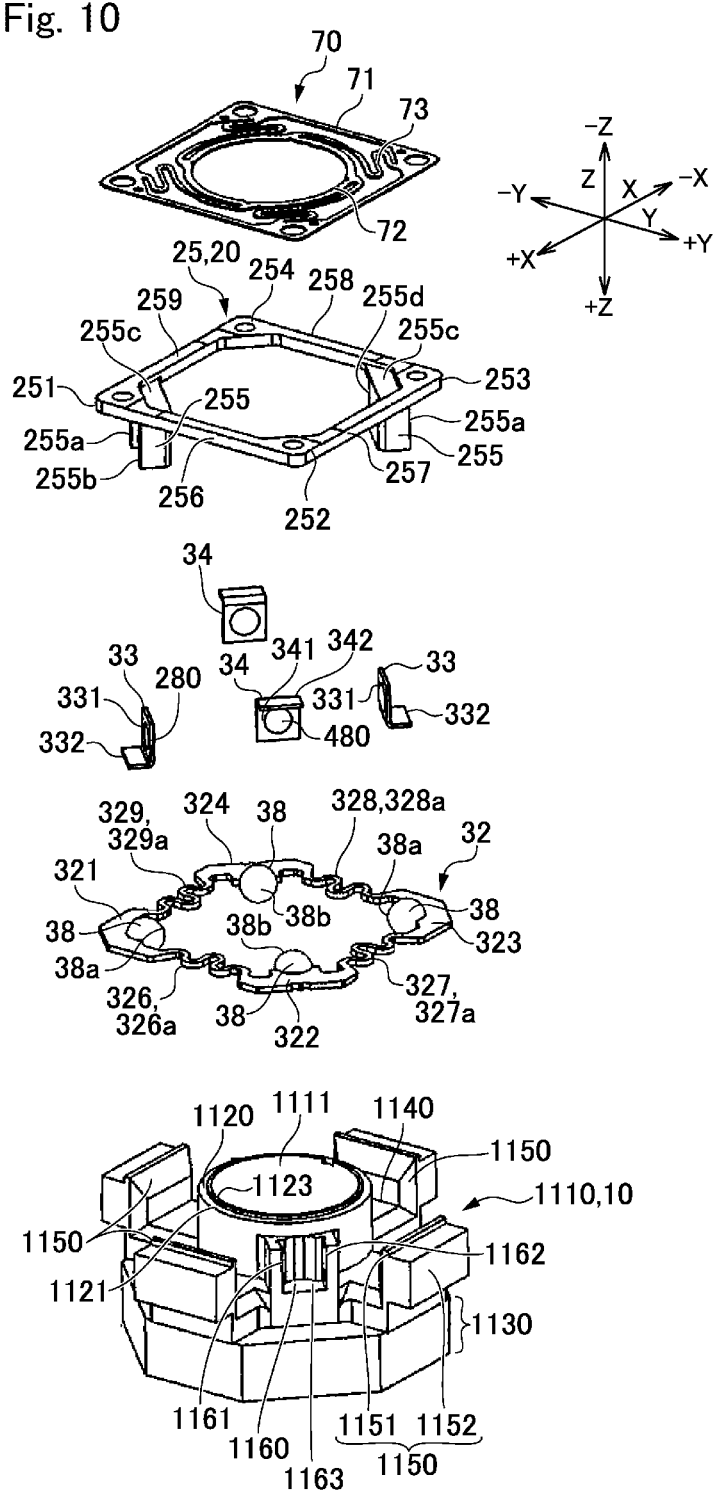
FIG. 10 is an exploded perspective view showing a gimbal mechanism and the like of an optical unit with a shake correction function in accordance with a second embodiment of the present invention.

FIGS. 9A, 9B, 9C and 9D are perspective views showing a gimbal mechanism and the like of the optical unit 100 with a shake correction function in accordance with the second embodiment of the present invention. FIG. 9A is a perspective view showing a state that a gimbal mechanism is attached to the holder, FIG. 9B is a perspective view showing a state that a movable frame and a fixed body side rectangular frame are detached from the holder, FIG. 9C is a perspective view showing a state that the fixed body side rectangular frame is detached from the holder, and FIG. 9D is a perspective view showing a first corner part of the fixed body side rectangular frame. FIG. 10 is an exploded perspective view showing a gimbal mechanism and the like of the optical unit 100 with a shake correction function in accordance with the second embodiment of the present invention. FIGS. 11A and 11B are explanatory views showing a plan structure of members used in a gimbal mechanism of the optical unit 100 with a shake correction function in accordance with the second embodiment of the present invention. FIG. 11A is a plan explanatory view showing a positional relationship of a plate-shaped member provided with a receiving part and a movable frame and FIG. 11B is a plan explanatory view showing a structure in a state that the plate-shaped member provided with the receiving part is detached from the movable frame. In FIGS. 11A and 11B, the holder, the movable frame and the fixed body side rectangular frame are respectively shown from the left side to the right side in the drawing.

In the optical unit 100 in this embodiment, in order to correct a shake of a hand, the optical module 10 is required to be swingably supported around a first axial line "L1" intersecting the optical axis "L" direction and the optical module 10 is required to be swingably supported around a second axial line "L2" intersecting the optical axis "L" direction and the first axial line "L1". Therefore, a gimbal mechanism 30 which will be described below with reference to FIGS. 9A through 11B is structured between the optical module 10 and the fixed body 20.

In this embodiment, in order to structure the gimbal mechanism 30 shown in FIGS. 9A through 11B, the holder 1110 of the optical module 10, a rectangular movable frame 32, and a rectangular frame 25 (fixed body side rectangular frame) which is fixed to the upper case 1200 (fixed body 20) by welding, adhesion or the like are used.

In this embodiment, the movable frame 32 is provided with a first corner part 321, a second corner part 322, a third corner part 323 and a fourth corner part 324 around the optical axis "L", and a first connecting part 326 (first side part), a second connecting part 327 (second side part), a third connecting part 328 (third side part) and a fourth connecting part 329 (fourth side part) are provided between the first corner part 321 and the second corner part 322, between the second corner part 322 and the third corner part 323, between the third corner part 323 and the fourth corner part 324, and between the fourth corner part 324 and the first corner part 321.

A metal spherical body 38 is fixed to inner sides of the first corner part 321, the second corner part 322, the third corner part 323 and the fourth corner part 324 of the movable frame 32 by welding or the like. The spherical body 38 structures protruded parts 38a and 38b whose hemispheric convex surfaces are directed to inner sides in the radial direction. Therefore, all of a plurality of the protruded parts 38a and 38b are located on the same plane ("XY" plane) intersecting the optical axis "L".

In this embodiment, the first connecting part 326, the second connecting part 327, the third connecting part 328 and the fourth connecting part 329 are provided with meandering parts 326a, 327a, 328a and 329a which are curved in a direction perpendicular to their extending directions and the "Z"-axis direction.

The cover 1600 is fixed to the end plate part 1220 of the upper case 1200 (fixed body 20) and the rectangular frame 25 is fixed to a face on one side "+Z" in the "Z"-axis direction of the rear plate part 1630 of the cover 1600 by welding, adhesion or the like. The rectangular frame 25 is provided with a first corner part 251, a second corner part 252, a third corner part 253 and a fourth corner part 254 around the optical axis "L", and is provided with a first side part 256, a second side part 257, a third side part 258 and a fourth side part 259 between the first corner part 251 and the second corner part 252, between the second corner part 252 and the third corner part 253, between the third corner part 253 and the fourth corner part 254, and between the fourth corner part 254 and the first corner part 251.

The first side part 256 and the first connecting part 326 are extended in the "Y"-axis direction on one side "+X" in the "X"-axis direction, and the third side part 258 and the third connecting part 328 are extended in the "Y"-axis direction on the other side "−X" in the "X"-axis direction. Further, the second side part 257 and the second connecting part 327 are extended in the "X"-axis direction on one side "+Y" in the "Y"-axis direction, and the fourth side part 259 and the fourth connecting part 329 are extended in the "X"-axis direction on the other side "−Y" in the "Y"-axis direction. Therefore, the first corner parts 251 and 321 are located on one side "+X" in the "X"-axis direction and the other side "−Y" in the "Y"-axis direction, the second corner parts 252 and 322 are located on one side "+X" in the "X"-axis direction and one side "+Y" in the "Y"-axis direction, the third corner parts 253 and 323 are located on the other side "−X" in the "X"-axis direction and one side "+Y" in the "Y"-axis direction, and the fourth corner parts 254 and 324 are located on the other side "−X" in the "X"-axis direction and the other side "−Y" in the "Y"-axis direction.

The rectangular frame 25 is provided with support plate parts 255 which are protruded from the first corner part 251 and the third corner part 253 (one side in the optical axis "L" direction) to one side "+Z" in the "Z"-axis direction (the other side in the optical axis "L" direction). In this embodiment, the support plate part 255 is provided with wall faces 255a and 255b which face each other on both sides in a circumferential direction and a recessed part which is opened outside in a radial direction is formed between the wall faces 255a and 255b. Further, an inner side in the radial direction between the wall faces 255a and 255b is closed by a wall face 255d.

A plate-shaped member 33 which is bent in an "L" shape is fixed between the wall faces 255a and 255b. The plate-shaped member 33 is located at the same height position as the coil holding parts 1150 in the "Z"-axis direction. In this embodiment, the plate-shaped member 33 is provided with a first plate part 331 which is extended in the "Z"-axis direction and a second plate part 332 which is bent outside in the radial direction at an end part on one side "+Z" in the "Z"-axis direction of the first plate part 331. The first plate part 331 is fixed to the wall face 255d and the wall faces 255a and 255b of the support plate part 255 formed in the rectangular frame 25. Therefore, a recessed part which is opened outside in the radial direction is formed at the first corner part 251 and the third corner part 253 of the rectangular frame 25 so as to be surrounded by the second plate part 332 of the plate-shaped member 33, the wall face 255d and the wall faces 255a and 255b of the support plate part 255 and a wall face 255c of the support plate part 255. The first plate part 331 of the plate-shaped member 33 is located on an inner side in the radial direction of the recessed part. In this embodiment, a receiving part 280 which is recessed in a hemispheric shape is formed on an outer side face in the radial direction of the first plate part 331.

In the holder 1110 which is used in the optical module 10, an outer peripheral face of the optical element holding part 1120 which is protruded from one side "+Z" in the "Z"-axis direction (the other side in the optical axis "L" direction) toward the other side "−Z" in the "Z"-axis direction (one side in the optical axis "L" direction) is formed with recessed parts 1160 on one side "+X" in the "X"-axis direction and one side "+Y" in the "Y"-axis direction and on the other side "−X" in the "X"-axis direction and the other side "−Y" in the "Y"-axis direction. In the "Z"-axis direction, the recessed part 1160 is located at the same height position as the coil holding part 1150.

Both sides of the recessed part 1160 are surrounded by wall faces 1161 and 1162 and its one side "+Z" in the "Z"-axis direction is closed by a wall face 1163. Further, an inner side in the radial direction of the recessed part 1160 is closed by an outer face of the optical element holding part 1120.

A plate-shaped member 34 which is bent in an "L" shape is fixed to an inner side of the recessed part 1160. The plate-shaped member 34 is located at the same height position as the coil holding part 1150 in the "Z"-axis direction. In this embodiment, the plate-shaped member 34 is provided with a first plate part 341 extended in the "Z"-axis direction and a second plate part 342 which is bent at an end part on the other side "−Z" in the "Z"-axis direction of the first plate part 341 toward an outer side in the radial direction. The first plate part 341 is fixed to the wall faces 1161 and 1162 of the recessed part 1160 and an outer face of the optical component holding part 1120. Therefore, the holder 1110 is formed with a recessed part which is surrounded by the wall faces 1161, 1162 and 1163 of the holder 1110 and the second plate part 342 of the plate-shaped member 34 and is opened toward an outer side in the radial direction. The first plate part 341 of the plate-shaped member 34 is located on an inner side in the radial direction of the recessed part. In this embodiment, a receiving part 480 which is recessed in a hemispheric shape is formed on an outer side face in the radial direction of the first plate part 341.

The optical module 10 is swingably supported around the first axial line "L1" intersecting the optical axis "L" direction and the optical module 10 is swingably supported around the second axial line "L2" intersecting the optical axis "L" direction and the first axial line "L1" by using the rectangular frame 25, the movable frame 32 and the holder 1110 structured as described above.

More specifically, in the swing support part between the first corner part 321 of the movable frame 32 and the first corner part 251 of the rectangular frame 25 and, in the swing support part between the third corner part 323 of the movable frame 32 and the third corner part 253 of the rectangular frame 25, the plate-shaped members 33 provided in the rectangular frame 25 are located on inner sides of the first corner part 321 and the third corner part 323 of the movable body 32 and thus the protruded parts 38a are supported by the receiving parts 280. As a result, the first corner part 321 and the third corner part 323 of the movable frame 32 located on the first axial line "L1" are swingably supported by the first corner part 251 and the third corner part 253 of the rectangular frame 25 (fixed body 20).

More specifically, in the swing support part between the second corner part 322 of the movable frame 32 and the holder 1110 and, in the swing support part between the fourth corner part 324 of the movable frame 32 and the holder 1110, the plate-shaped members 34 provided in the holder 1110 are located on inner sides of the second corner part 322 and the fourth corner part 324 of the movable frame 32 and thus the protruded parts 38*b* are supported by the receiving parts 480. As a result, the second corner part 322 and the fourth corner part 324 of the movable frame 32 located on the second axial line "L2" swingably support the holder 1110 (optical module 10).

In this manner, the optical module 10 is swingably supported around the first axial line "L1" and is swingably supported around the second axial line "L2" by the fixed body 20 through the movable frame 32 which is used in the gimbal mechanism 30. Further, all of the movable frame 32 and the plate-shaped members 33 and 34 are located at the same height position as the coil holding part 1150. Therefore, when viewed in a direction perpendicular to the optical axis "L" direction, the gimbal mechanism 30 is provided at a position overlapping with the shake correction drive mechanism 500. Especially, in this embodiment, when viewed in a direction perpendicular to the optical axis "L" direction, the gimbal mechanism 30 is provided at a position overlapping with the center in the "Z"-axis direction of the shake correction drive mechanism 500.

In this embodiment, the movable frame 32 is structured of metal material having elasticity which is not resiliently bent to a lower side by the weight of the optical module 10 itself but, when an impact is applied from the outside, the movable frame 32 is provided with elasticity capable of absorbing the impact. Further, each of the first connecting part 326, the second connecting part 327, the third connecting part 328 and the fourth connecting part 329 of the movable frame 32 is capable of being elastically deformed to an inner side and an outer side. Therefore, the protruded parts 38*a* and 38*b* and the receiving parts 280 and 480 are elastically contacted with each other at each of the first corner part 321, the second corner part 322, the third corner part 323 and the fourth corner part 324 by elasticities of the first connecting part 326, the second connecting part 327, the third connecting part 328 and the fourth connecting part 329. Accordingly, rattling is not occurred between the protruded parts 38*a* and 38*b* and the receiving parts 280 and 480.

(Structure of Plate-Shaped Spring 70)

The optical module 10 in this embodiment includes a plate-shaped spring 70 which is connected with the optical module 10 and the fixed body 20 to restrict a posture of the optical module 10 when the shake correction drive mechanism 500 is set in a stopped state. In this embodiment, the plate-shaped spring 70 is a spring member which is formed by processing a metal plate in a predetermined shape and is provided with a fixed body side connection part 71 in a rectangular frame shape, a movable body side connection part 72 in a circular ring shape, and plate spring parts 73 which connect the fixed body side connection part 71 with the movable body side connection part 72. In this embodiment, the plate spring part 73 is extended from a corner portion of the fixed body side connection part 71 to the movable body side connection part 72 while meandering from one side to the other side in a circumferential direction.

The fixed body side connection part 71 is fixed to a face on the other side "−Z" in the "Z"-axis direction of the rectangular frame 25 and the movable body side connection part 72 is fixed to an end face 1121 on the other side "−Z" in the "Z"-axis direction of the optical component holding part 1120 of the holder 1110 by welding, adhesion or the like. In this embodiment, the end face 1121 on the other side "−Z" in the "Z"-axis direction of the optical component holding part 1120 is formed with a protruded part 1123 in a circular ring shape along an inner circumferential edge. The movable body side connection part 72 is fitted to an outer side in a radial direction of the protruded part 1123.

The plate-shaped spring 70 is also provided at a position overlapping with the shake correction drive mechanism 500 when viewed in a direction perpendicular to the optical axis "L" direction. However, when viewed in a direction perpendicular to the optical axis "L" direction, although the gimbal mechanism 30 is provided at a position overlapping with the center in the "Z"-axis direction of the shake correction drive mechanism 500, the plate-shaped spring 70 is located on the other side "−Z" in the "Z"-axis direction relative to the position overlapping with the center in the "Z"-axis direction of the shake correction drive mechanism 500. Therefore, when viewed in a direction perpendicular to the optical axis "L" direction, the gimbal mechanism 30 is provided at a nearer position to the center position in the optical axis "L" direction of the shake correction drive mechanism 500 than the plate-shaped spring 70.

(Structure of Photo Reflector 590)

As shown in FIG. 7B, in the optical unit 100 in this embodiment, a photo reflector 590 is mounted on a portion of the flexible circuit board 1900 which is overlapped with the optical module 10 on one side "+Z" in the "Z"-axis direction so as to direct to one side "+Z" in the "Z"-axis direction. Further, a reflecting plate 1490 is formed at a position facing the photo reflector 590 on a face on the other side "−Z" in the "Z"-axis direction of the bottom plate part 1420 of the lower case 1400. In this embodiment, the reflecting plate 1490 is a metal block shaped component and thus its dimension in the "Z"-axis direction (thickness) is large. Therefore, since a distance between the photo reflector 590 and the reflecting plate 1490 is short, its detection sensitivity is high.

(Structure and Basic Operation of Shake Correction Drive Mechanism 500 and the Like)

Also in the optical unit 100 in this embodiment, similarly to the first embodiment, when the optical device 1000 shown in FIG. 1 is shaken, the shake is detected by a gyroscope or the like and a control IC (not shown) controls the shake correction drive mechanism 500. In other words, a drive current for canceling the shake detected by the gyroscope is supplied to the air-core coils 560. In this case, the electric current is supplied to a part of four air-core coils 560 and the electric current is not supplied to other air-core coils 560. Alternatively, the electric current is supplied to all of four air-core coils 560 but balance of the electric current supplied to the four air-core coils 560 is controlled. As a result, the optical module 10 is swung around the first axial line "L1" or around the second axial line "L2" to correct the shake of a hand. Alternatively, the optical module 10 is swung around the first axial line "L1" and is swung around the second axial line "L2" to correct the shake of a hand. In this case, the second photo reflector 590 detects a distance (displacement) to the optical module 10 and the shake correction drive mechanism 500 is controlled based on a detected result by the photo reflector 590.

(Principal Effects in this Embodiment)

As described above, also in the optical unit 100 in this embodiment, similarly to the first embodiment, the rectangular movable frame 32 is disposed between the optical module 10 and the rectangular tube-shaped body part 1210 of the fixed body 20, and the first corner part 321 and the third corner part 323 of the movable frame 32 are swingably supported by the fixed body 20 and the second corner part 322 and the fourth corner part 324 of the movable frame 32 swingably support the optical module 10. Therefore, even when the optical module 10 is swingably supported by the fixed body 20 through the gimbal mechanism 30, a space for disposing the shake correction drive mechanism 500 can be secured near the first connecting part 326, the second connecting part 327, the third connecting part 328 and the fourth connecting part 329 of the movable frame 32 between a side face of the optical module 10 and a side face of the fixed body 20.

Further, in this embodiment, when viewed in a direction perpendicular to the optical axis "L" direction, the gimbal mechanism 30 is provided at a position overlapping with the shake correction drive mechanism 500. Therefore, when the optical module 10 is swung, displacement of a portion of the optical module 10 where the coils 1560 and the magnets 1520 are disposed is small and thus, even when the coil 1560 and the magnet 1520 are disposed at a near position to each other, the coil 1560 and the magnet 1520 are hard to be contacted with each other. Accordingly, the coil 1560 and the magnet 1520 can be approached to each other and thus a large drive force is obtained. Further, in a case of the gimbal mechanism 30, when driving is stopped, a force for returning the optical module 10 to its original posture is small or no force for returning the optical module 10 to its original posture is generated. However, in this embodiment, the plate-shaped spring 70 is connected with the optical module 10 and the fixed body 20 and thus, when driving is stopped, the optical module 10 can be surely returned to its original posture. Further, when viewed in a direction perpendicular to the optical axis "L" direction, the plate-shaped spring 70 is provided at a position overlapping with the shake correction drive mechanism 500. Therefore, when the optical module 10 is swung, displacement of a portion of the optical module 10 where the plate-shaped spring 70 is disposed is small and thus deformation of the plate-shaped spring 70 is small. Accordingly, a resistance force by the plate-shaped spring 70 is small and thus, when the optical module 10 is swung, a large swing force can be applied to the optical module 10. Further, since deformation of the plate-shaped spring 70 is small, a structure of the plate-shaped spring 70 can be simplified.

Further, when viewed in a direction perpendicular to the optical axis "L" direction, the gimbal mechanism 30 is provided at a near position to the center position in the optical axis "L" direction of the shake correction drive mechanism 500 relative to the plate-shaped spring 70. Therefore, when the optical module 10 is swung, displacement of the portion of the optical module 10 where the coil 1560 and the magnet 1520 are disposed can be made small. Accordingly, the coils 1560 and the magnets 1520 can be approached to each other and thus a large drive force is obtained.

Further, the fixed body 20 structures the gimbal mechanism 30 by utilizing the rectangular frame 25 (fixed body side rectangular frame) with which the plate-shaped spring 70 is connected and thus assembling is easily performed and the number of components can be reduced.

Further, the coils 1560 are held by the optical module 10 and the magnets 1520 are held by an inner face of the rectangular tube-shaped body part 1210 of the fixed body 20. Therefore, the coil 1560 whose weight is lighter than the magnet 1520 is provided in the optical module 10 and thus a drive current for shake correction can be made small and responsibility of shake correction can be improved.

In addition, in the optical module 10, the holder 1110 is provided with the optical component holding part 1120, the movable frame arrangement space 1140 where the movable frame 32 is disposed on an outer side in a radial direction of the optical component holding part 1120, and the coil holding parts 1150 which hold the coils 1560 on an outer side of the movable frame arrangement space 1140. Therefore, when viewed in the optical axis "L" direction, the gimbal mechanism 30 can be provided on an inner side relative to an outward form of the holder 1110. Further, the coil 1560 is an air-core coil and the coil holding part 1150 is provided with the protruded part 1152 which is fitted to an opening part of the coil 1560. Therefore, the coil 1560 can be easily and surely provided at a predetermined position. Further, the protruded part 1152 is protruded toward the magnet 1520 from a face of the coil 1560 facing the magnet 1520. Therefore, even in a case that the optical module 10 is swung due to an impact or the like or, even in a case that the optical module 10 is displaced in a direction perpendicular to the optical axis "L" direction, the coil 1560 does not contact with the magnet 1520. Accordingly, damage of the coil 1560 can be prevented.

Further, the coil holding parts 1150 are provided on outer sides in a radial direction of the middle positions of the first connecting part 326, the second connecting part 327, the third connecting part 328 and the fourth connecting part 329 of the movable frame 32. Therefore, the coil holding parts 1150 are provided at angular positions displaced from the first corner part 321, the second corner part 322, the third corner part 323 and the fourth corner part 324 of the movable frame 32 and thus, when viewed in the optical axis "L" direction, an outward form of the holder 1110 can be made small.

Further, when viewed in the optical axis "L" direction, the end plate part 1220 of the upper case 1200 is formed with the opening part 1221 whose opening edge is located on an outer side in a radial direction relative to a face of the magnet 1520 facing the coil 1560 and thus magnetic lines of force of the magnet 1520 can be restrained from directing to the end plate part 1220 of the upper case 1200 (yoke) on the front side in the optical axis "L" direction. Accordingly, intensity of the magnetic field interlinking with the coil 1560 can be increased.

Further, the nonmagnetic cover 1600 is fixed to the end plate part 1220 of the upper case 1200. The cover 1600 is provided with the tube part 1620 which is protruded from an inner circumferential edge of the front plate part 1610 overlapped with the end plate part 1220 toward a rear side in the optical axis "L" direction through the opening part 1221 of the upper case 1200 and surrounds the front side end part in the optical axis "L" direction of the optical module 10. Therefore, dust and the like can be suppressed from entering into the inside. Further, the cover 1600 is nonmagnetic and thus, even when the cover 1600 is provided, magnetic lines of force of the magnet 1520 can be suppressed from directing in an unnecessary direction. Therefore, intensity of the magnetic field interlinked with the coil 1560 can be increased.

Further, the front plate part 1610 of the cover 1600 is fixed with the plate-shaped stopper 1700 which surrounds the front side end part in the optical axis "L" direction of the optical module 10 when viewed from a front side in the optical axis "L" direction. Therefore, even in a case that the optical module 10 is swung or the optical module 10 is displaced in a direction perpendicular to the optical axis direction due to an impact or the like, its displaced amount can be restricted by the plate-shaped stopper 1700. Further, the plate-shaped stopper 1700 restricts displacement of the optical module 10 by abutting with the front side end part in the optical axis "L" direction of the optical module 10 and thus the plate-shaped stopper 1700 is located at a separated position from a swing center of the optical module 10. Therefore, in comparison with a case that displacement of the optical module 10 is restricted by abutting of the coil 1560 with the magnet 1520 or the like, influence of attaching accuracy of components is hardly affected and thus a displacement allowance amount can be set with a high degree of accuracy.

Further, the flexible circuit board 1900 which is connected with the optical module 10 is provided with the first curved part 1910 and the second curved part 1920 which are bent in a circular arc shape on the way of its extended portion along the "Y" direction. Therefore, even when the optical module 10 is swung in the "Y" direction, the flexible circuit board 1900 does not apply a large resistance force to the optical module 10. Further, the first curved part 1910 and the second curved part 1920 are curved in reverse directions to each other and, in addition, the first curved part 1910 and the second curved part 1920 are curved with the same radius of curvature as each other. Therefore, when the optical module 10 is swung in the "Y" direction, resistance forces applied to the optical module 10 can be canceled by the first curved part 1910 and the second curved part 1920. Further, in the flexible circuit board 1900, the first curved part 1910, the strip-shaped part 1930 and the second curved part 1920 are branched into two portions in the "X" direction (second direction) by the slit 1950 extending along the "Y" direction (first direction). Therefore, even when the optical module 10 is swung in the "X" direction, the flexible circuit board 1900 does not apply a large resistance force to the optical module 10.

Further, the gimbal mechanism 30 is structured so that the protruded parts 38a and 38b are supported by the receiving parts 280 and 480 in a concave shape and thus, in comparison with a case swingably structured through a shaft body, assembling process can be simplified. In addition, the protruded parts 38a and 38b are formed so that their tip end faces located on the sides of the receiving parts 280 and 480 are formed in a hemispheric shape. Therefore, even when the movable frame 32 and the optical module 10 are swung in any posture, sliding of the protruded parts 38a and 38b on the receiving parts 280 and 480 is smooth. Further, the protruded parts 38a and 38b and the receiving parts 280 and 480 are elastically contacted with each other by elasticity of the movable frame 32. Therefore, rattling is hard to be occurred between the protruded parts 38a and 38b and the receiving parts 280 and 480.

Further, all of a plurality of the protruded parts 38a and 38b are provided on the movable frame 32. Further, all of a plurality of the protruded parts 38a and 38b are located on the same plane intersecting the optical axis "L". Therefore, the structure of the gimbal mechanism 30 can be simplified.

Further, the receiving parts 280 and 480 are respectively formed in the plate-shaped members 33 and 34 which are separately formed from the fixed body 20 and the holder 1110. Therefore, regardless of structure and material of the fixed body 20 and the holder 1110 of the optical module 10, the receiving parts 280 and 480 can be structured superior in slidability and durability for the protruded parts 38a and 38b.

Further, the protruded parts 38a provided in the first corner part 321 and the third corner part 323 of the movable frame 32 are surrounded by the wall faces 255a, 255b and 255c of the fixed body 20 side and the second plate parts 332 (wall face) of the plate-shaped members 33. Further, the protruded parts 38b provided in the second corner part 322 and the fourth corner part 324 of the movable frame 32 are surrounded by the wall faces 1161, 1162 and 1163 of the optical module side and the second plate parts 342 (wall face) of the plate-shaped members 34. Therefore, even when an impact is applied, the protruded parts 38a and 38b are hard to be disengaged from the receiving parts 280 and 480.

[Other Structural Examples of Optical Unit 100]

In the embodiment described above, the present invention is, as an example, applied to the optical unit 100 which is used in a cell phone with a camera. However, at least an embodiment of the present invention may be applied to the optical unit 100 which is used in a thin digital camera or the like. Further, other than a cell phone, a digital camera and the like, the optical unit 100 with a shake correction function to which at least an embodiment of the present invention is applied may be fixed in an apparatus such as a refrigerator in which vibration is occurred in a certain interval and mounted so as to be capable of being remote controlled. According to the apparatus, a service can be provided in which information in the inside of the refrigerator is obtained at a visit place, for example, at the time of shopping. According to this service, the camera system is provided with a posture stabilizing device and thus a stable image can be transmitted even when vibration may occur in the refrigerator. Further, this device may be fixed to a device such as a bag, a satchel or a cap of a child and a student which is carried at a time of commuting or attending school. In this case, states of surroundings are photographed at a constant interval and, when the image is transmitted to a predetermined server, the parent or the like watches the image at a remote place to secure security of the child. In this application, without conscious of a camera, a clear image is photographed even when vibration occurs at the time of moving. Further, when a GPS is mounted in addition to a camera module, the position of a target person can be obtained simultaneously and thus, when an accident occurs, its position and situation can be confirmed immediately. In addition, when the optical unit 100 with a shake correction function to which at least an embodiment of the present invention is applied is mounted at a position which is capable of photographing toward a front side in a car, it can be used as a drive recorder. Further, it may be structured that the optical unit 100 with a shake correction function to which at least an embodiment of the present invention is applied is mounted at a position which is capable of photographing toward a front side in a car and a front side image is photographed automatically at a constant interval and the image is automatically transmitted to a predetermined server. Further, when this image is distributed while interlocking with traffic jam information in the Vehicle Information and Communication System or the like, the situation of a traffic jam can be provided further in detail. According to this service, similarly to a drive recorder mounted on a car, the situation when an accident has occurred can be recorded by a third person of passer-by without intention to utilize an inspection of the situation. Further, a clear image can be acquired without affected by vibration of a car. In a case of the application, when a power supply is turned on, a command signal is outputted to the control section and the shake control is started on the basis of the command signal.

Further, the optical unit 100 with a shake correction function to which at least an embodiment of the present invention is applied may be applied to shake correction of an optical device from which a light beam is emitted such as a laser beam pointer, a portable or on-vehicle projection display device and a direct viewing type display device. Further, in an observation system with a high magnification such as an astronomical telescope system or a binocular system, the optical unit 100 may be used to observe without using an auxiliary locking device such as three-legged supports. In addition, when at least an embodiment of the present invention is applied to a rifle or a turret of a tank, its attitude can be stabilized against vibration at the time of trigger and thus hitting accuracy can be enhanced.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. An optical unit with a shake correction function comprising:
   an optical module;
   a fixed body having a body part which surrounds the optical module;
   a gimbal mechanism structured to swingably support the optical module around a first axial line intersecting an optical axis direction and swingably support the optical module around a second axial line intersecting the optical axis direction and the first axial line; and
   a shake correction drive mechanism structured to drive the optical module around the first axial line and the second axial line;
   wherein the gimbal mechanism comprises a rectangular movable frame comprising a first corner part, a second corner part adjacent to the first corner part, a third corner part separated in a direction of the first axial line from the first corner part, and a fourth corner part separated in a direction of the second axial line from the second corner part around an optical axis;
   wherein the first corner part and the third corner part of the movable frame are swingably supported by the fixed body, and the second corner part and the fourth corner part of the movable frame swingably support the optical module;
   a first swing support part provided between the first corner part and the fixed body comprises a first protruded part provided in one of the movable frame and the fixed body and a first receiving part in a concave shape in the other of the movable frame and the fixed body structured to receive a tip end side of the first protruded part;
   a second swing support part provided between the second corner part and the optical module comprises a second protruded part provided in one of the movable frame and the optical module and a second receiving part in a concave shape in the other of the movable frame and the optical module structured to receive a tip end side of the second protruded part;
   a third swing support part provided between the third corner part and the fixed body comprises a third protruded part provided in one of the movable frame and the fixed body and a third receiving part in a concave shape in the other of the movable frame and the fixed body structured to receive a tip end side of the third protruded part; and
   a fourth swing support part provided between the fourth corner part and the optical module comprises a fourth protruded part provided in one of the movable frame and the optical module and a fourth receiving part in a concave shape in the other of the movable frame and the optical module structured to receive a tip end side of the fourth protruded part.

2. The optical unit with a shake correction function according to claim 1, the shake correction drive mechanism comprises wherein a coil and a magnet disposed in a space between a side face of the optical module and a side face of the body part.

3. The optical unit with a shake correction function according to claim 1, wherein a receiving part side tip end face of one of the first protruded part, second protruded part, third protruded part, and fourth protruded part comprises a hemispheric shape.

4. The optical unit with a shake correction function according to claim 3, wherein a surface of one of the first protruded part, second protruded part, third protruded part, and fourth protruded part is structured of a spherical body.

5. The optical unit with a shake correction function according to claim 1, wherein
   in the movable frame, a first connecting part connecting the first corner part with the second corner part, a second connecting part connecting the second corner part with the third corner part, a third connecting part connecting the third corner part with the fourth corner part and a fourth connecting part connecting the fourth corner part with the first corner part are elastically deformable, and
   the first protruded part and the first receiving part, the second protruded part and the second receiving part, the third protruded part and the third receiving parts, and the fourth protruded part and the fourth receiving part are respectively elastically contacted with each other by elasticities of the first connecting part, the second connecting part, the third connecting part and the fourth connecting part.

6. The optical unit with a shake correction function according to claim 5, wherein each of the first connecting part, the second connecting part, the third connecting part and the fourth connecting part is provided with a meandering part which meanders in a direction intersecting the optical axis direction.

7. The optical unit with a shake correction function according to claim 1, wherein each of the first protruded part, the second protruded part, the third protruded part, and the fourth protruded part is provided on the movable frame.

8. The optical unit with a shake correction function according to claim 7, wherein the first protruded part, the second protruded part, the third protruded part, and the fourth protruded part are located in a same plane intersecting the optical axis.

9. The optical unit with a shake correction function according to claim 7, wherein
   the first protruded part, the second protruded part, the third protruded part, and the fourth protruded part are provided on an inner side of the movable frame,
   the first receiving part and the third receiving part are formed in portions which are protruded in the optical axis direction from a side of the fixed body so as to be located on an inner side of the movable frame, and
   the second receiving part and the fourth receiving part are formed in portions which are protruded in the optical axis direction from a side of the optical module so as to be located on an inner side of the movable frame.

10. The optical unit with a shake correction function according to claim 9, wherein
    the first receiving part and the third receiving part are formed in portions which are protruded from one side position in the optical axis direction relative to the movable frame to the other side in the optical axis direction so as to be located on the inner side of the movable frame, and the second receiving part and the fourth receiving part are formed in portions which are protruded from the other side position in the optical axis direction relative to the movable frame to the one side in the optical axis direction so as to be located on the inner side of the movable frame.

11. The optical unit with a shake correction function according to claim 9, wherein the first receiving part and the third receiving part are respectively formed in a plate-shaped member which is fixed to the fixed body, and the second receiving part and the fourth receiving part are respectively formed in a plate-shaped member which is fixed to the optical module.

12. The optical unit with a shake correction function according to claim 9, wherein in the movable frame, the first corner part is protruded to an outer side relative to extended lines of connecting parts which are adjacent to the first corner part on both sides, and the third corner part is protruded to an outer side relative to extended lines of connecting parts which are adjacent to the third corner part on both sides.

13. The optical unit with a shake correction function according to claim 1, wherein the fixed body comprises:
  two wall faces interposing each of first protruded part and third protruded part from both sides; and
  two wall faces interposing each of first protruded part and the third protruded part from both sides in the optical axis direction; and the optical module comprises:
  two wall faces interposing each of the second protruded part and the fourth protruded part from both sides; and
  two wall faces interposing each of the second protruded part and the fourth protruded part from both sides in the optical axis direction.

14. The optical unit with a shake correction function according to claim 1, wherein the first corner part and the third corner part of the movable frame are supported by corner parts of a fixed body side rectangular frame which is fixed to an inner face of the body part, and the second corner part and the fourth corner part of the movable frame support corner parts of a module side rectangular frame which is fixed to an outer face of the optical module.

15. The optical unit with a shake correction function according to claim 14, wherein the fixed body side rectangular frame is provided with an engagement protruded part which is engaged with a cut-out part formed in the body part.

16. The optical unit with a shake correction function according to claim 14, wherein the magnet is held by the optical module, and
the coil is held on an inner face of the body part.

17. The optical unit with a shake correction function according to claim 14, wherein the coil is held by the optical module, and
the magnet is held on an inner face of the body part.

18. The optical unit with a shake correction function according to claim 14, wherein the shake correction drive mechanism comprises a coil and a magnet disposed in a space between a side face of the optical module and a side face of the body part.

19. The optical unit with a shake correction function according to claim 1, wherein the optical module comprises an optical component and a holder which holds the optical component, and the holder comprises:
  an optical component holding part which holds the optical component;
  a movable frame arrangement space where the movable frame is disposed on an outer side in a radial direction of the optical component holding part; and
  a coil holding part which holds the coil on an outer side of the movable frame arrangement space.

20. The optical unit with a shake correction function according to claim 19, wherein the coil holding part is provided at each of positions on an outer side in the radial direction of a middle position between the first corner part and the second corner part, on an outer side in the radial direction of a middle position between the second corner part and the third corner part, on an outer side in the radial direction of a middle position between the third corner part and the fourth corner part, and on an outer side in the radial direction of a middle position between the fourth corner part and the first corner part.

21. The optical unit with a shake correction function according to claim 1, wherein the shake correction drive mechanism comprises a coil and a magnet disposed in a space between a side face of the optical module and a side face of the body part.

22. The optical unit with a shake correction function according to claim 21, wherein the magnet is held by the optical module, and
the coil is held on an inner face of the body part.

23. The optical unit with a shake correction function according to claim 21, wherein the coil is held by the optical module, and
the magnet is held on an inner face of the body part.

24. An optical unit with a shake correction function comprising:

an optical module;

a fixed body having a body part which surrounds the optical module;

a gimbal mechanism structured to swingably support the optical module around a first axial line intersecting an optical axis direction and swingably support the optical module around a second axial line intersecting the optical axis direction and the first axial line; and a shake correction drive mechanism structured to drive the optical module around the first axial line and the second axial line;

wherein the gimbal mechanism comprises a rectangular movable frame comprising a first corner part, a second corner part adjacent to the first corner part, a third corner part separated in a direction of the first axial line from the first corner part, and a fourth corner part separated in a direction of the second axial line from the second corner part around an optical axis; and wherein the first corner part and the third corner part of the movable frame are swingably supported by the fixed body, and the second corner part and the fourth corner part of the movable frame swingably support the optical module;

wherein the first corner part and the third corner part of the movable frame are supported by corner parts of a fixed body side rectangular frame which is fixed to an inner face of the body part, and the second corner part and the fourth corner part of the movable frame support corner parts of a module side rectangular frame which is fixed to an outer face of the optical module, wherein the shake correction drive mechanism comprises a coil and a magnet disposed in a space between a side face of the optical module and a side face of the body part;

wherein in the gimbal mechanism, a first swing support part provided between the first corner part and the fixed body comprises a first protruded part provided in one of the movable frame and the fixed body and a first receiving part in a concave shape in the other of the movable frame and the fixed body structured to receive a tip end side of the first protruded part;

a second swing support part provided between the second corner part and the optical module comprises a second protruded part provide in one of the movable frame and the optical module and a second receiving part in a concave shape in the other of the movable frame and the optical module structured to receive a tip end side of the second protruded part;

a third swing support part provided between the third corner part and the fixed body comprises a third protruded part provided in one of the movable frame and the fixed body and a third receiving part in a concave shape in the other of the movable frame and the fixed body structured to receive a tip end side of the third protruded part; and a fourth swing support part provided between the fourth corner part and the optical module comprises a fourth protruded part provided in one of the movable frame and the optical module and a fourth receiving part in a concave shape in the other of the movable frame and the optical module structured to receive a tip end side of the fourth protruded part.

25. The optical unit with a shake correction function according to claim 24, wherein a receiving part side tip end face of one of the first protruded part, second protruded part, third protruded part, and fourth protruded part is formed in a hemispheric shape.

* * * * *